(12) United States Patent
Burman et al.

(10) Patent No.: US 11,435,983 B2
(45) Date of Patent: *Sep. 6, 2022

(54) WORKFLOW SUPPORT FOR DYNAMIC ACTION OUTPUT

(71) Applicant: ServiceNow, Inc., Santa Clara, CA (US)

(72) Inventors: Jacob Samuel Burman, Carlsbad, CA (US); Rebecca Anita Dias, Seattle, WA (US); Joshua Timothy Nerius, Chicago, IL (US); Christopher Maloy, Payson, UT (US); Alberto Alvarado Jimenez, Santee, CA (US); Harry Thomas Nelson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,423

(22) Filed: Jan. 25, 2021

(65) Prior Publication Data

US 2021/0141617 A1 May 13, 2021

Related U.S. Application Data

(63) Continuation of application No. 16/773,568, filed on Jan. 27, 2020, now Pat. No. 10,929,107, which is a (Continued)

(51) Int. Cl.
*G06F 8/34* (2018.01)
*G06Q 10/06* (2012.01)
(Continued)

(52) U.S. Cl.
CPC .............. *G06F 8/34* (2013.01); *G06F 3/0482* (2013.01); *G06F 9/44521* (2013.01);
(Continued)

(58) Field of Classification Search
None
See application file for complete search history.

(56) References Cited

U.S. PATENT DOCUMENTS

| 5,999,911 A | 12/1999 | Berg |
| 6,321,229 B1 | 11/2001 | Goldman |

(Continued)

FOREIGN PATENT DOCUMENTS

| EP | 004556611-0001 | 2/2018 |
| EP | 004556611-0002 | 2/2018 |

(Continued)

OTHER PUBLICATIONS

"ServiceNow London IT Operations Management", ServiceNow Docs, Mar. 12, 2019, 88 pages.
(Continued)

*Primary Examiner* — Qing Chen
(74) *Attorney, Agent, or Firm* — Fletcher Yoder PC

(57) ABSTRACT

Persistent storage may contain metadata actions and integration actions related to a remote service, wherein the remote service includes a remote service application programming interface (API) that provides access to structured data, and a metadata API that provides access to a schema of the structured data. Processors may be configured to: (i) generate and provide, for metadata action design graphical user interfaces (GUIs), options for specification of a metadata action, where the metadata action defines a metadata query to the metadata API, rules for parsing the schema, and a normalized format for the structured data; (ii) generate and provide, for integration action design GUIs, options for specification of an integration action, where the integration action defines a structured data query to the remote service
(Continued)

API and an indication that the metadata action is to be used to represent a result of the structured data query in the normalized format.

20 Claims, 31 Drawing Sheets

Related U.S. Application Data continuation-in-part of application No. 16/592,216, filed on Oct. 3, 2019, now Pat. No. 10,809,982, which is a continuation of application No. 16/358,148, filed on Mar. 19, 2019, now Pat. No. 10,452,360.

(51) Int. Cl.
 *G06F 9/54* (2006.01)
 *G06F 3/0482* (2013.01)
 *G06F 9/445* (2018.01)
 *G06F 9/451* (2018.01)

(52) U.S. Cl.
 CPC .............. *G06F 9/451* (2018.02); *G06F 9/541* (2013.01); *G06Q 10/0633* (2013.01)

(56) References Cited

U.S. PATENT DOCUMENTS

| | | | |
|---|---|---|---|
| 6,609,122 | B1 | 8/2003 | Ensor |
| 7,020,706 | B2 | 3/2006 | Cates |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,610,512 | B2 | 10/2009 | Gerber |
| 7,617,073 | B2 | 11/2009 | Trinon |
| 7,689,628 | B2 | 3/2010 | Garg |
| 7,716,353 | B2 | 5/2010 | Golovinsky |
| 7,769,718 | B2 | 8/2010 | Murley |
| 7,783,744 | B2 | 8/2010 | Garg |
| 7,890,802 | B2 | 2/2011 | Gerber |
| 7,925,981 | B2 | 4/2011 | Pourheidar |
| 7,930,396 | B2 | 4/2011 | Trinon |
| 7,945,860 | B2 | 5/2011 | Vambenepe |
| 7,966,398 | B2 | 6/2011 | Wiles |
| 8,051,162 | B2 | 11/2011 | Peuter |
| 8,051,164 | B2 | 11/2011 | Peuter |
| 8,151,261 | B2 | 4/2012 | Sirota |
| 8,224,683 | B2 | 7/2012 | Manos |
| 8,266,096 | B2 | 9/2012 | Navarrete |
| 8,402,127 | B2 | 3/2013 | Solin |
| 8,457,928 | B2 | 6/2013 | Dang |
| 8,478,569 | B2 | 7/2013 | Scarpelli |
| 8,612,408 | B2 | 12/2013 | Trinon |
| 8,646,093 | B2 | 2/2014 | Myers |
| 8,674,992 | B2 | 3/2014 | Poston |
| 8,689,241 | B2 | 4/2014 | Naik |
| 8,743,121 | B2 | 6/2014 | De Peuter |
| 8,832,652 | B2 | 9/2014 | Mueller |
| 8,887,133 | B2 | 11/2014 | Behnia |
| 9,065,783 | B2 | 6/2015 | Ding |
| 9,098,322 | B2 | 8/2015 | Apte |
| 9,122,552 | B2 | 9/2015 | Whitney |
| 9,239,857 | B2 | 1/2016 | Non |
| 9,317,327 | B2 | 4/2016 | Apte |
| 9,363,252 | B2 | 6/2016 | Meuller |
| 9,535,737 | B2 | 1/2017 | Joy |
| 9,645,833 | B2 | 5/2017 | Mueller |
| 9,654,473 | B2 | 5/2017 | Miller |
| 9,766,935 | B2 | 9/2017 | Kelkar |
| 9,792,387 | B2 | 10/2017 | George |
| 9,805,322 | B2 | 10/2017 | Kelkar |
| 10,101,972 | B1 | 10/2018 | George |
| 2003/0004770 | A1 | 1/2003 | Miller et al. |
| 2004/0148213 | A1 | 7/2004 | Aziz et al. |
| 2004/0148214 | A1 | 7/2004 | Aziz et al. |
| 2004/0148299 | A1 | 7/2004 | Teegan et al. |
| 2005/0066304 | A1 | 3/2005 | Tattrie et al. |
| 2014/0236663 | A1 | 8/2014 | Smith et al. |
| 2015/0370540 | A1 | 12/2015 | Coslovi et al. |
| 2017/0147290 | A1 | 5/2017 | Kumar et al. |
| 2017/0315789 | A1 | 11/2017 | Lam et al. |
| 2017/0329506 | A1 | 11/2017 | Laetham et al. |
| 2018/0107461 | A1 | 4/2018 | Balasubramanian et al. |
| 2018/0321654 | A1 | 11/2018 | Tucker |
| 2018/0321833 | A1 | 11/2018 | Nelson |
| 2018/0324051 | A1 | 11/2018 | Dias |

FOREIGN PATENT DOCUMENTS

| | | |
|---|---|---|
| EP | 004556611-0003 | 2/2018 |
| EP | 004556611-0004 | 2/2018 |
| EP | 004556611-0005 | 2/2018 |
| EP | 004556611-0006 | 2/2018 |
| EP | 004556611-0007 | 2/2018 |
| EP | 004556611-0008 | 2/2018 |
| EP | 3454203 A1 | 3/2019 |

OTHER PUBLICATIONS

"ServiceNow London Platform Capabilities", ServiceNow Docs, Mar. 12, 2019, 354 pages.
Nelson, U.S. Appl. No. 16/133,438, filed Sep. 17, 2018, 43 pages.

| Offboarding | Status: Draft | App: User Management | Edit | Test | Copy | Save | Activate |

| Action | State | Start time | Duration |
|---|---|---|---|
| 1. Look up records in [sc_request] when requested for is Trigger->[sys_user] Record | Complete | 09:08:15 | 120ms |
| 2. For each item in 1->[sc_request] Records | Complete | 09:08:15 | 2195ms |
| 2.1. Update 2->[sc_request] Record (Request state->Closed cancelled, Comments->"User no longer with company") | Complete | 09:08:16 | 796ms |
| 3. Look up records in [task] when assigned to is Trigger->[sys_user] Record | Complete | 09:08:17 | 43ms |
| 4. For each item in 3->[task] Records | Complete | 09:08:17 | 338ms |
| 4.1. Update 4->[task] Record (Assigned to->Trigger->[sys_user]->Manager) | Complete | 09:08:17 | 70ms |

Metadata Action Design Phase (may require some coding skills)    700
- Specify how to obtain definition of remote service API from a metadata API
- Specify how to parse and store definition of remote service API
- Save and publish metadata action Integration Action Design Phase (requires understanding of remote API but no coding skills)    702
- Specify remote service structured data to access and how to access it
- Specify that output from query to remote service is parsed by metadata action and stored in a dynamic object
- Save and publish integration action Workflow Design Phase (requires understanding of overall goal but no knowledge of remote API or coding skills)    704
- Specify trigger
- Specify step with integration action (options for output are dynamically retrieved from remote service API)
- Specify any other flows, subflows and actions
- Store designed flow Workflow Execution Phase    706
- Determine that trigger has fired
- Execute designed flow with output parsed as specified in the workflow design phase
- Execute any other flows, subflows and actions

FIG. 7A

WORKFLOW SUPPORT FOR DYNAMIC ACTION OUTPUT

CROSS-REFERENCE TO RELATED APPLICATIONS

This application is a continuation of and claims priority to U.S. patent application Ser. No. 16/773,568, filed Jan. 27, 2020, issued as U.S. Pat. No. 10,929,107 on Feb. 23, 2021, which is a continuation-in-part of and claims priority to U.S. patent application Ser. No. 16/592,216, filed Oct. 3, 2019, issued as U.S. Pat. No. 10,809,982 on Oct. 20, 2020, which is a continuation of and claims priority to U.S. patent application Ser. No. 16/358,148, filed Mar. 19, 2019, issued as U.S. Pat. No. 10,452,360 on Oct. 22, 2019, all of which are hereby incorporated by reference in their entireties for all purposes.

BACKGROUND

A workflow is a specific sequence or series of tasks that, when performed, seeks to accomplish one or more goals. In some cases, workflows may be represented or thought of as a state machine having two or more states connected by various transitions therebetween. Transitions from state to state may be triggered by or based on user input, automated input, information being stored in a database, the value of information in a database changing, or by way of other mechanisms. Workflows may be supported by way of a remote network management platform that provides a web-based interface for workflow definition, execution, and management.

Enterprise workflows may integrate information from various sources, including from remote services hosted on third-party servers outside of the remote network management platform and the enterprise. For example, a workflow applying a particular information technology (IT) policy to an enterprise user's computing device or account may consider the capabilities of the computing device as well as the user's profile and access permissions. The former information may be stored locally within the remote network management platform, and is thus readily available and under control of the enterprise. On the other hand, the latter information may be outsourced to a remote service.

In order to obtain the user's profile and access permissions, the remote network management platform may be configured with appropriate credentials to access the remote service, as well as a schema thereof that defines tables, fields, forms, application programming interfaces, and so on that contain the sought-after information. Nonetheless, the remote service or the enterprise may, from time to time, change this schema. If the remote network management platform does not adapt its access requests accordingly, its workflows will either fail or be unable to access all of the information available by way of the remote service.

SUMMARY

The embodiments herein provide graphical user interfaces (GUIs) and other mechanisms to integrate with a remote service that stores sought-after information in a schema that may be unknown to the workflow designer and/or that may change from time to time. These GUIs allow an action of a workflow to be defined with dynamic output, so that the workflow can adapt to these changes. Advantageously, this allows workflows to be defined in a flexible, no-code fashion. In particular, actions incorporated into a workflow during workflow design are not hard-coded to a specific version of the schema. Therefore, these actions can provide the workflow designer with options to fully utilize the schema as it exists during workflow design, e.g., by introspecting the remote service's current schema.

In particular, the embodiments herein may relate to three distinct phases: design of a metadata action that obtains a definition of a schema of structured data accessible by way of a remote service application programming interface (API), design of an integration action that obtains information from the remote service by using the remote service API, and design of a workflow a carries out a specific task by incorporating these two actions. Doing so may cause, during the workflow design phase, dynamic retrieval of information from the metadata API regarding the capabilities of the remote service API. Examples of this include a list of tables accessible by way of the API, and lists of columns in these tables. Operations on one or more of these tables and/or columns may be added to the workflow. The workflow may be further defined with additional flows, subflows, and actions. A definition of the workflow may be stored to memory.

During subsequent workflow execution, a trigger event may cause the workflow to begin execution. When the integration action is performed, it may carry out the operations on the tables and/or columns as defined in the workflow.

In this fashion, a user can incorporate integration actions that manipulate specific data accessible by way of the remote service API without having to write program code to support this accessing and manipulating. Instead, actions with dynamic output, as well as workflows incorporating these actions, can be defined in a no-code fashion and by way of a GUI. This dramatically decreases the amount of time needed to provide workflow support for a remote service API.

Accordingly, a first example embodiment may involve persistent storage configured to store definitions of metadata actions and integration actions related to a remote service, wherein the remote service includes a remote service API that provides access to structured data, and wherein the remote service includes a metadata API that provides access to a schema of the structured data. The first example embodiment may also involve one or more processors configured to perform operations that comprise: (i) generating and providing, for display on a set of metadata action design GUIs, options that allow specification of a metadata action involving the remote service, wherein the metadata action defines a metadata query to the metadata API, rules for parsing the schema of the structured data, and a normalized format for the structured data; (ii) generating and providing, for display on a set of integration action design GUIs, options that allow specification of an integration action involving the remote service, wherein the integration action defines a structured data query to the remote service API and an indication that the metadata action is to be used to represent a result of the structured data query in the normalized format; and (iii) writing, to the persistent storage, representations of the metadata action and the integration action.

A second example embodiment may involve generating and providing, by a computing device and for display on a set of metadata action design GUIs, options that allow specification of a metadata action involving a remote service, wherein the metadata action defines: (i) a metadata query to a metadata API of the remote service, (ii) rules for parsing a schema of structured data provided by the metadata API, and (iii) a normalized format for the structured data. The second example embodiment may also involve generating and providing, by the computing device and for display on a set of integration action design GUIs, options that allow specification of an integration action involving the remote service, wherein the integration action defines: (i) a structured data query to a remote service API of the remote service that provides access to the structured data, and (ii) an indication that the metadata action is to be used to represent a result of the structured data query in the normalized format. The second example embodiment may also involve writing, by the computing device and to persistent storage, representations of the metadata action and the integration action.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, 6C, 6D, 6E, 6F, 6G, 6H, 6I, 6J, and 6K depict workflow design tool graphical user interfaces, in accordance with example embodiments.

FIG. 7A depicts phases of metadata action design, integration action design, workflow design, and workflow execution, in accordance with example embodiments.

DETAILED DESCRIPTION

Figure 1:
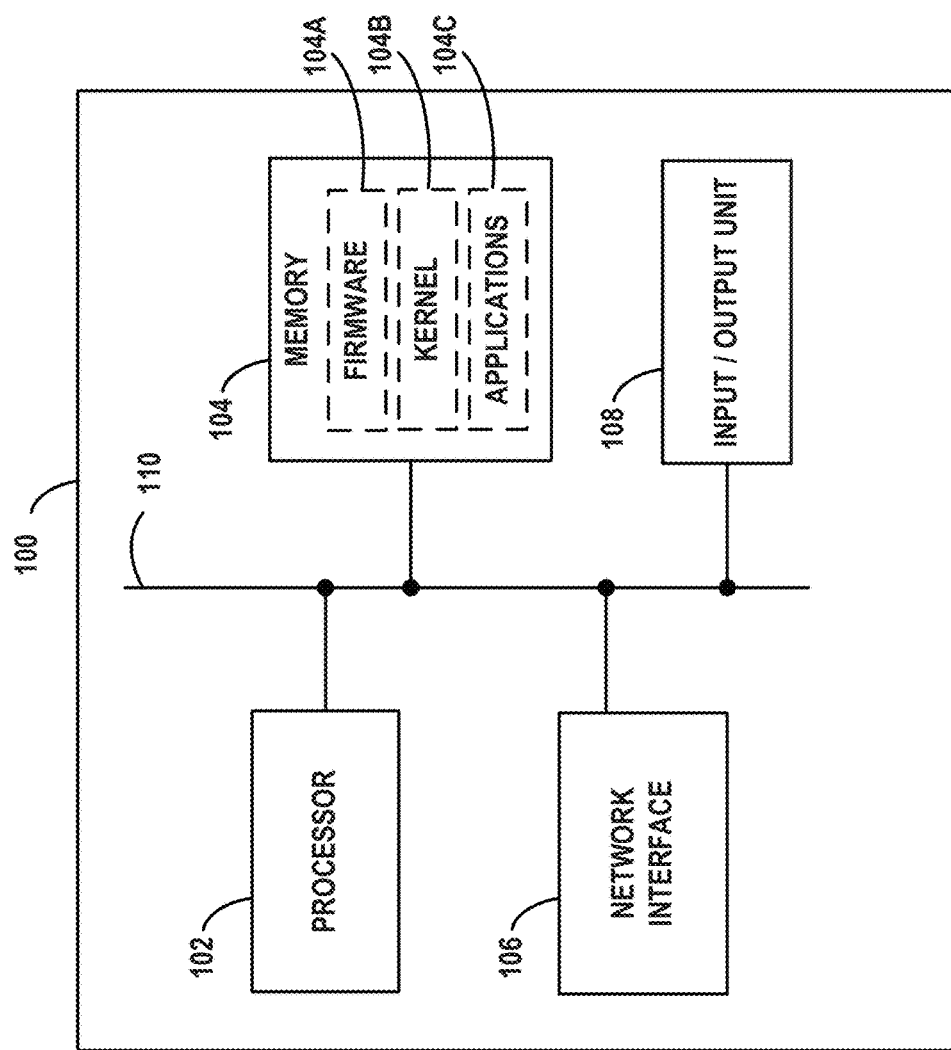
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
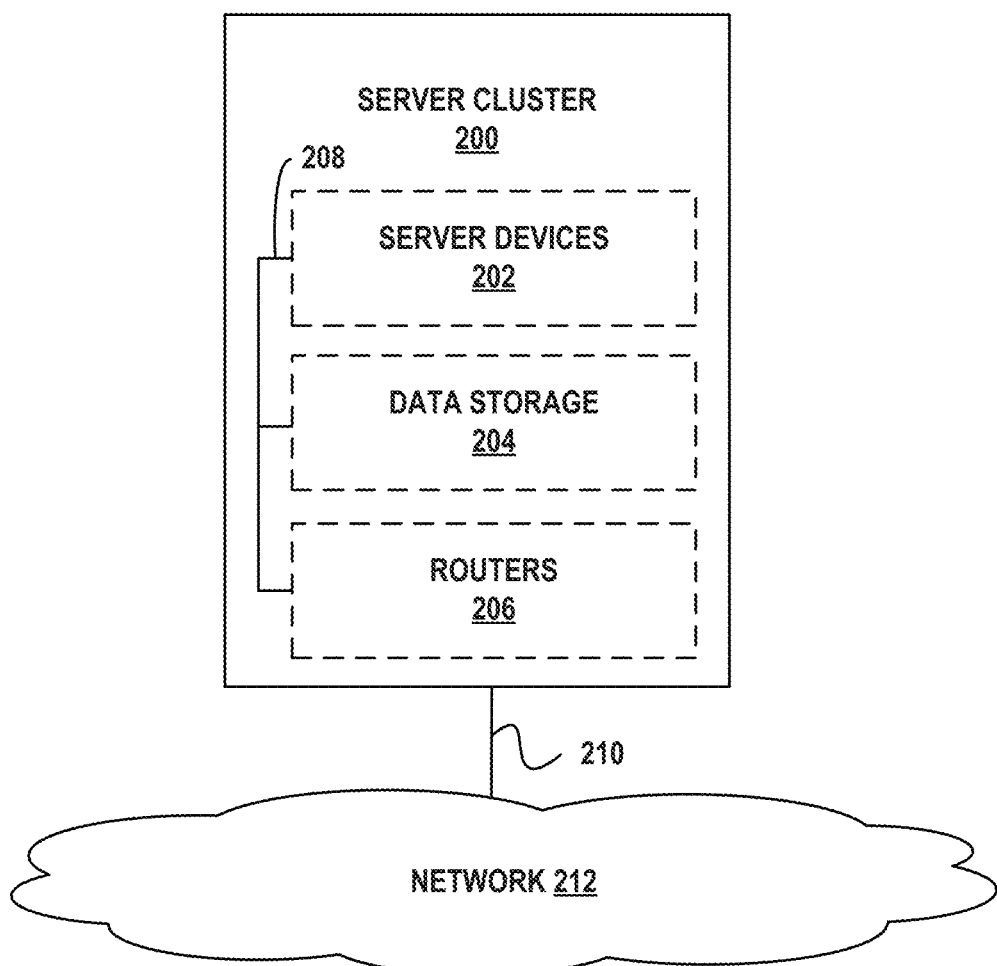
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
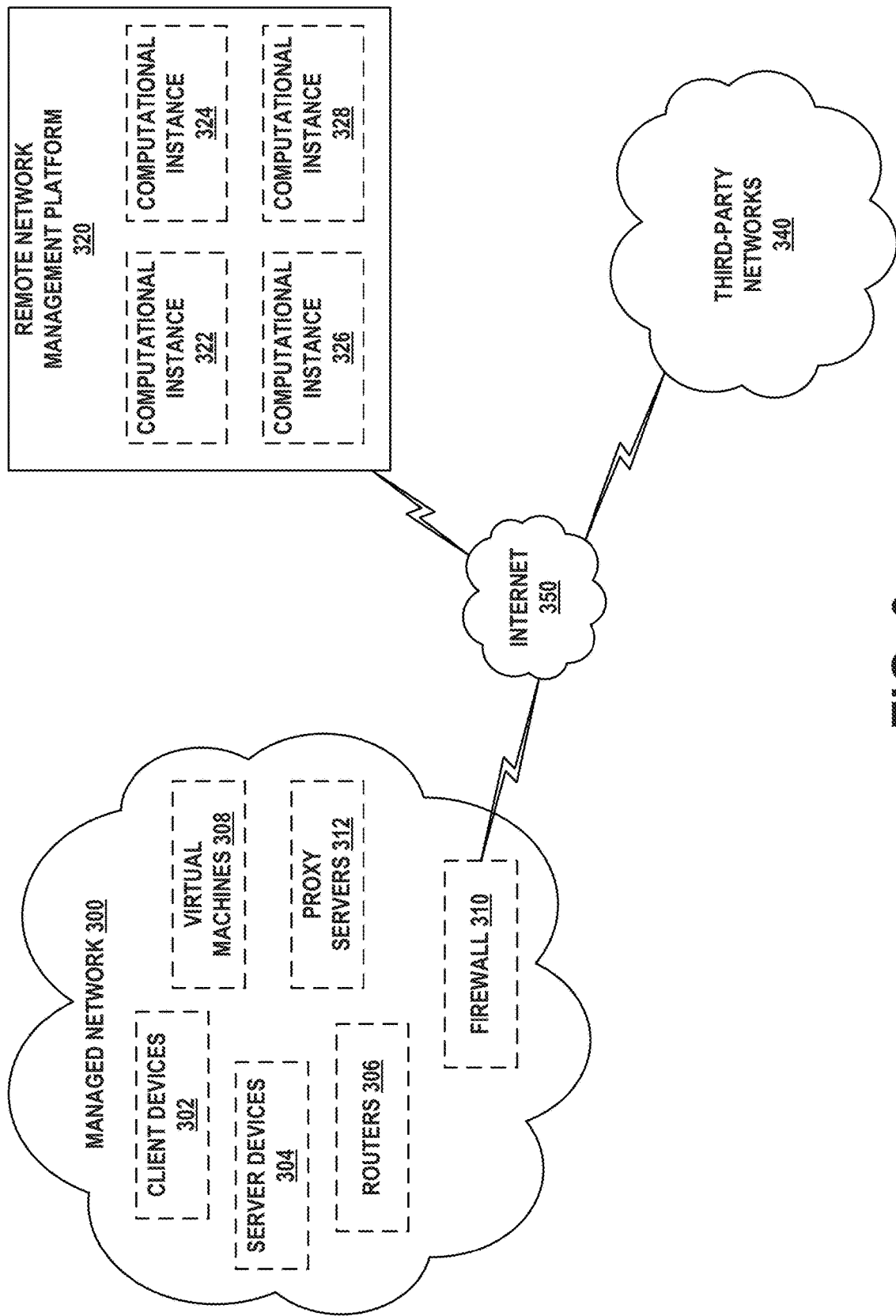
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
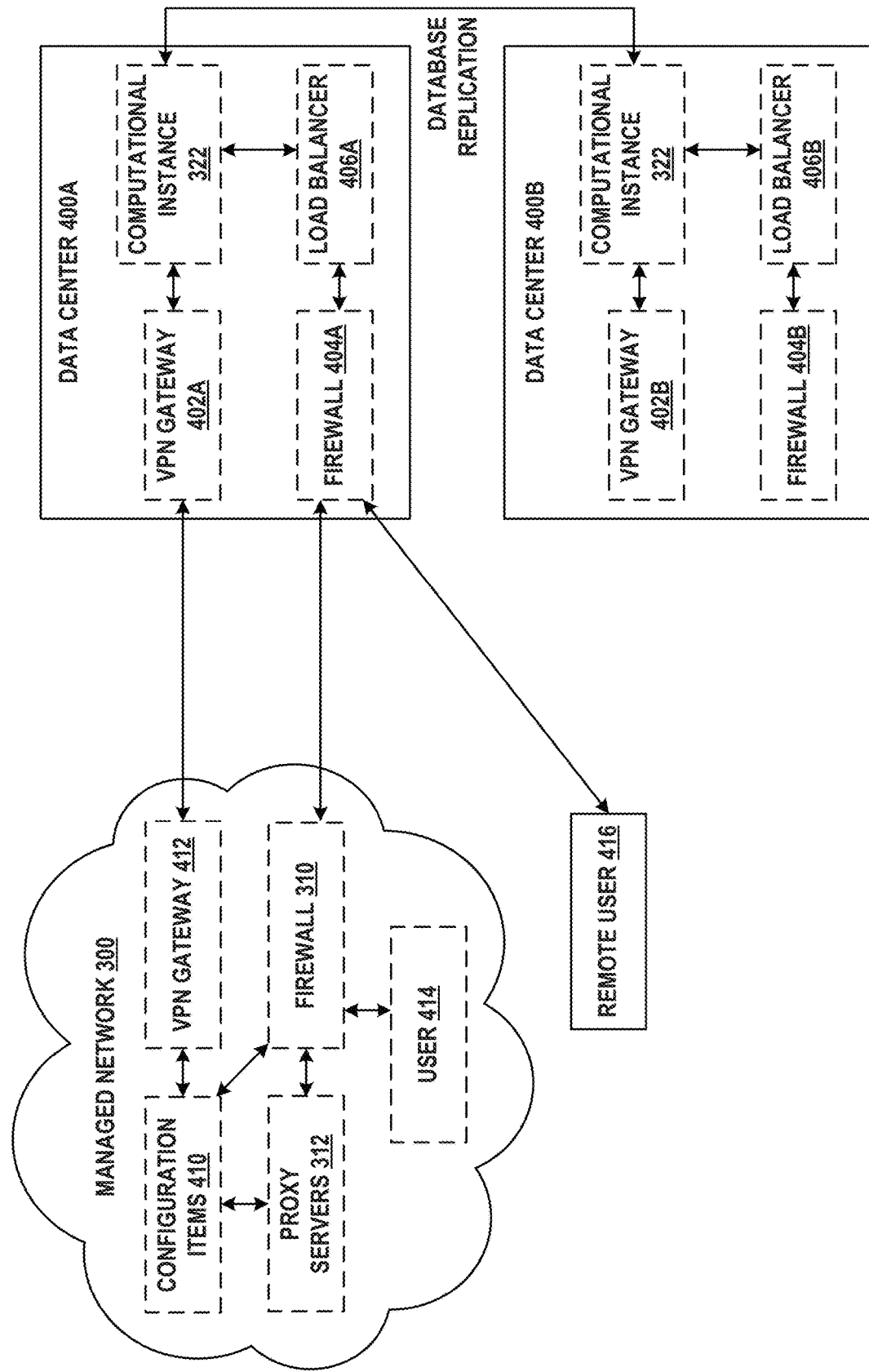
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
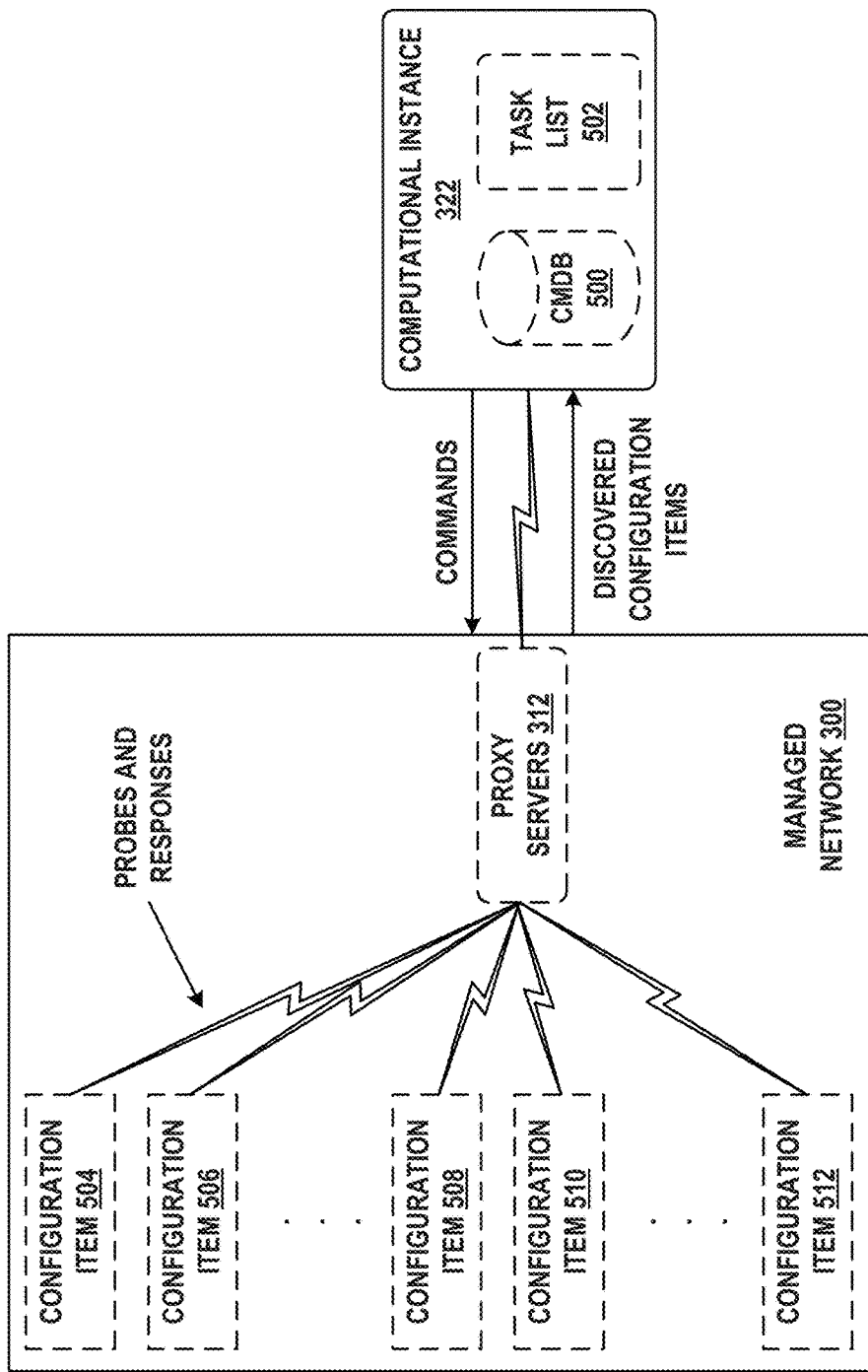
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
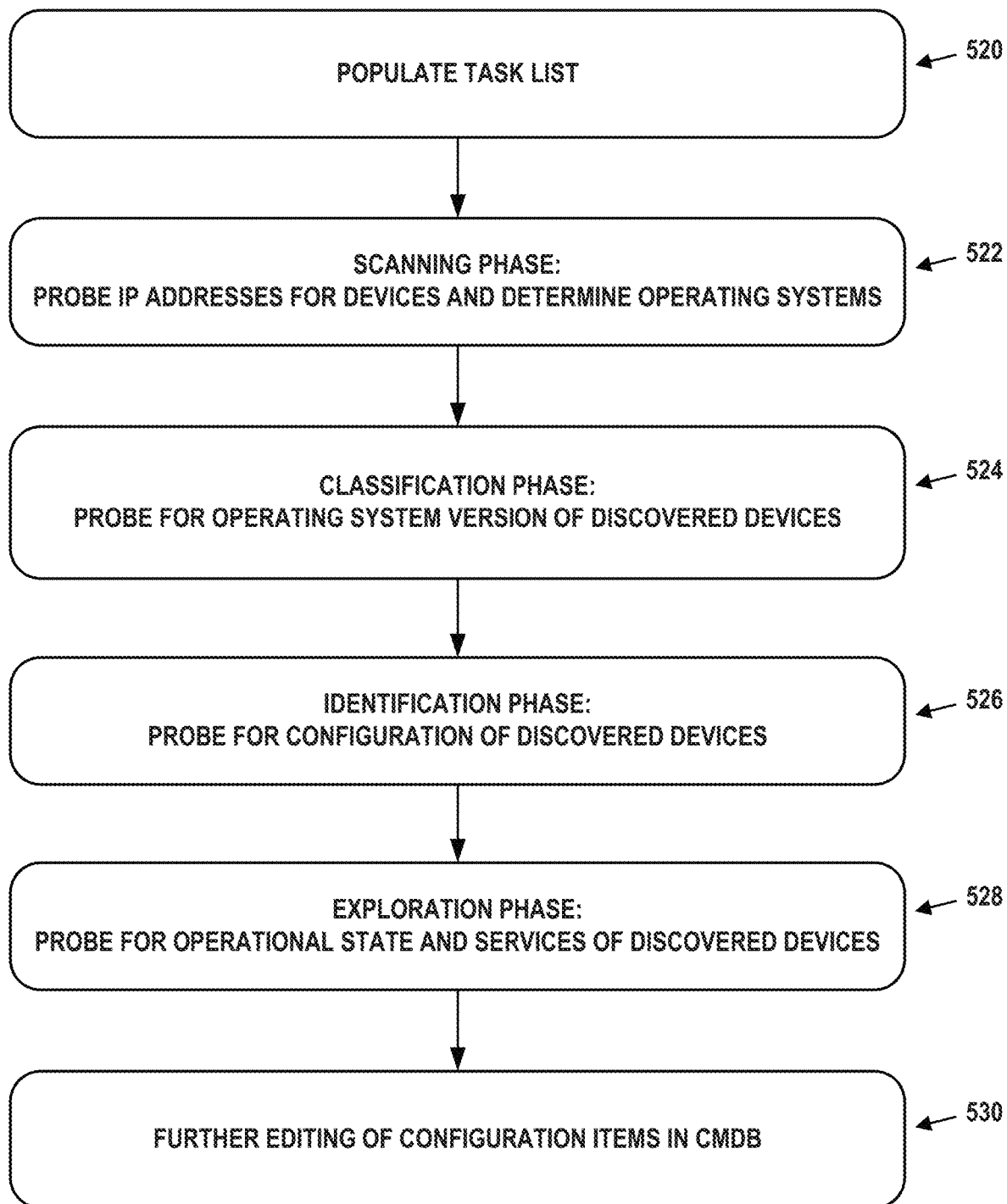
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Workflow Design Tool

Computational instances of the remote network management platform discussed herein may enable the specification and execution of workflows on behalf of their respective managed networks. A workflow is a specific sequence or series of tasks that, when performed, accomplish one or more goals. In some cases, workflows may be represented as flow charts, with one or more starting states, intermediate states, and ending states connected by various transitions therebetween. Some states may be visited zero times or more than one time. Also, some states may have more than one possible next state, thus representing a decision to be made in the workflow, either based on user input, automated input, information stored in a database, or by way of other mechanisms. Triggers may also be defined that cause certain transitions between states, input to be acquired, or output to be produced.

Such a workflow can be implemented on a computational instance through use of a software-based workflow design tool. Such a tool presents the workflow designer with options for defining the states, transitions, triggers, actions, input data, output data, and other characteristics of the workflow. The tool may utilize a GUI, and may be embodied as a series of one or more web pages and/or web-based applications deployed upon the computational instance. Once completed and released, employees of the managed network may make use of the workflow to carry out various tasks in an organized and efficient fashion. Notably, the workflow design tool can be a so-called "low-code/no-code" solution, with which designers either write very little program code, or no code at all, to implement the workflow.

While the embodiments herein provide support for general workflow design, an example workflow design tool may be implemented based around specific definitions of triggers, actions, and workflow logic. Triggers may be used to specify conditions that start a workflow, such as a change to an entry in a database (e.g., the addition or updating of a configuration item in a CMDB) or according to a schedule (e.g., once per day or once per week). A trigger causes one or more actions to be performed, and each action may be controlled by workflow logic that specifies the conditions that must be true for the action to be performed. The action may involve changing the state of information in a database, sending a notification (e.g., an email) to a user, and so on.

In some cases, sub-flows may be defined and incorporated into a workflow. A sub-flow may be an automated or semi-automated process including a sequence of reusable actions and specific data inputs that allow it to be started from within a flow, another sub-flow, or script. Thus, sub-flows can be applied to multiple workflows.

As an illustrative example of a workflow, consider an employee offboarding scenario, in which an employee has left an enterprise for some reason (e.g., the employee quit, got fired, passed away, etc.). The goals of the workflow are to: (i) look up and cancel any pending catalog requests (e.g., equipment requisitions) opened by the departed employee, and (ii) reassign any open tasks (e.g., pending approvals, units of work that are to be accomplished) assigned to the departed employee to his or her manager. In various embodiments, more or fewer goals may be present.

Figure 6A:
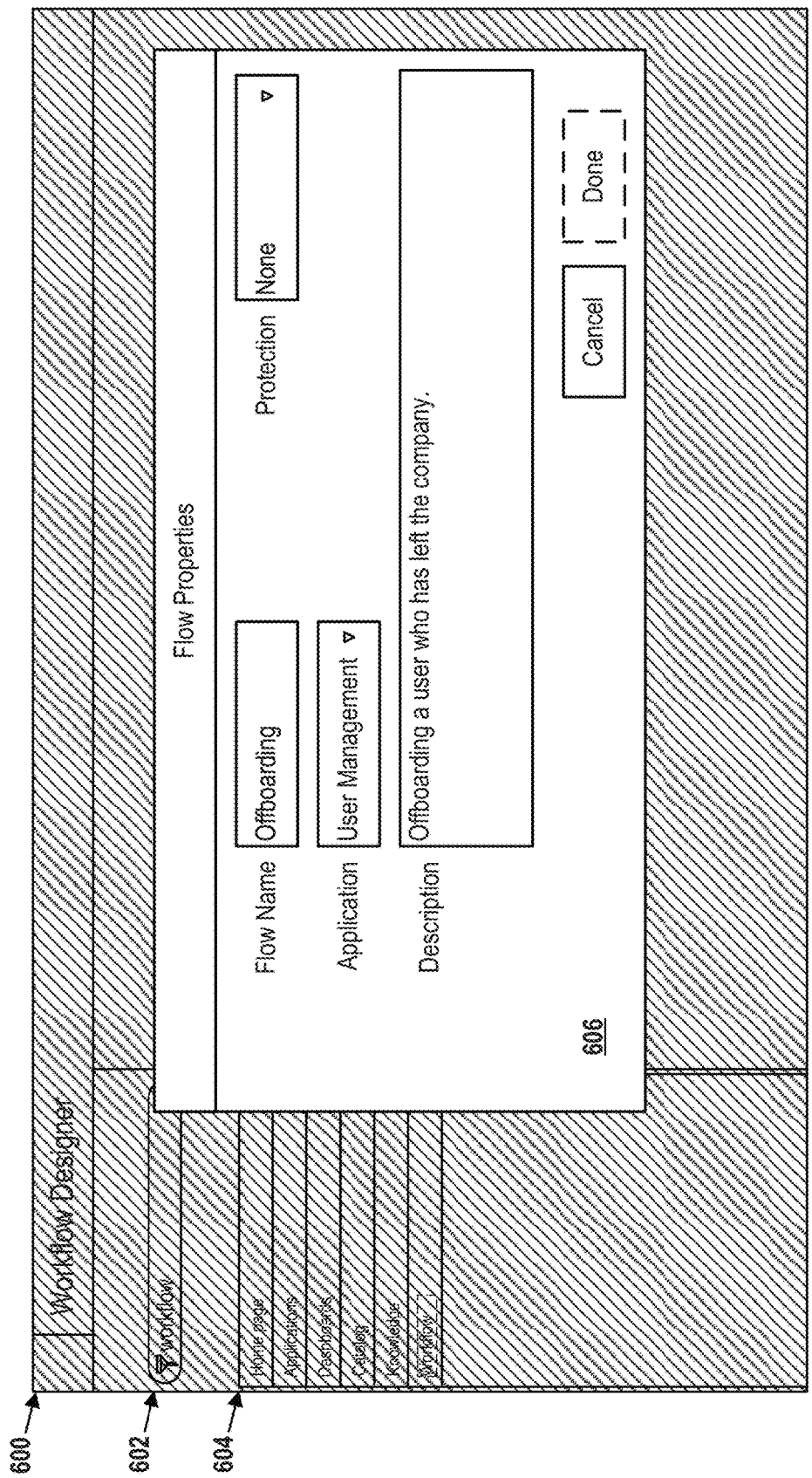

The workflow design tool may present the designer with a series of GUI pages that allow the designer to specify the workflow. Examples of such pages are shown in FIGS. 6A-6J, while results of an automated test of the workflow are shown in FIG. 6K. Notably, these examples are merely for purposes of illustration and not intended to be limiting. The workflow design tool may be able to provide other GUIs including alternative arrangements of information usable for designing workflows.

FIG. 6A depicts GUI 600. The background of GUI 600 shows a web-based menu for selecting features and/or applications supported by a computational instance. This background is denoted as such by hash marks.

For example, GUI 600 includes dialog box 602 in which a user has entered the search term "workflow". This selects the workflow design tool from the bottom of menu 604. This selection is reflected by the text "Workflow Designer" appearing at the top of GUI 600.

GUI 600 also includes pop up window 606. Alternatively, window 606 may be a pane overlaid on top of GUI 600 and not a separate window. Regardless, window 606 allows a user to initiate creation of a new workflow by specifying its properties. In GUI 600, these properties are the workflow's name "Offboarding", the workflow's scoped application "User Management", the workflow's description "Offboarding a user who has left the company", and whether the workflow is to be protected. In alternative embodiments more or fewer properties may be specified.

The workflow's name may be free-form text entered by the user. The workflow's scoped application may be selected from a drop-down menu of applications or specified as global. As the workflow in GUI 600 is limited to the "User Management" scoped application, this workflow may be considered to be part of this application. The workflow's description may also be free-form text. The workflow's protection specifies whether it is modifiable ("none") or read-only ("read-only") by other workflow designers or users.

Once the user is satisfied with the information entered in window 606, the user may select or otherwise activate the "Done" button. This selection is denoted in FIG. 6A by this button being depicted with a dashed line. Once the user completes the dialog of window 606, the next phase of the workflow design tool, which allows the user to specify a trigger, may be displayed.

Figure 6B:
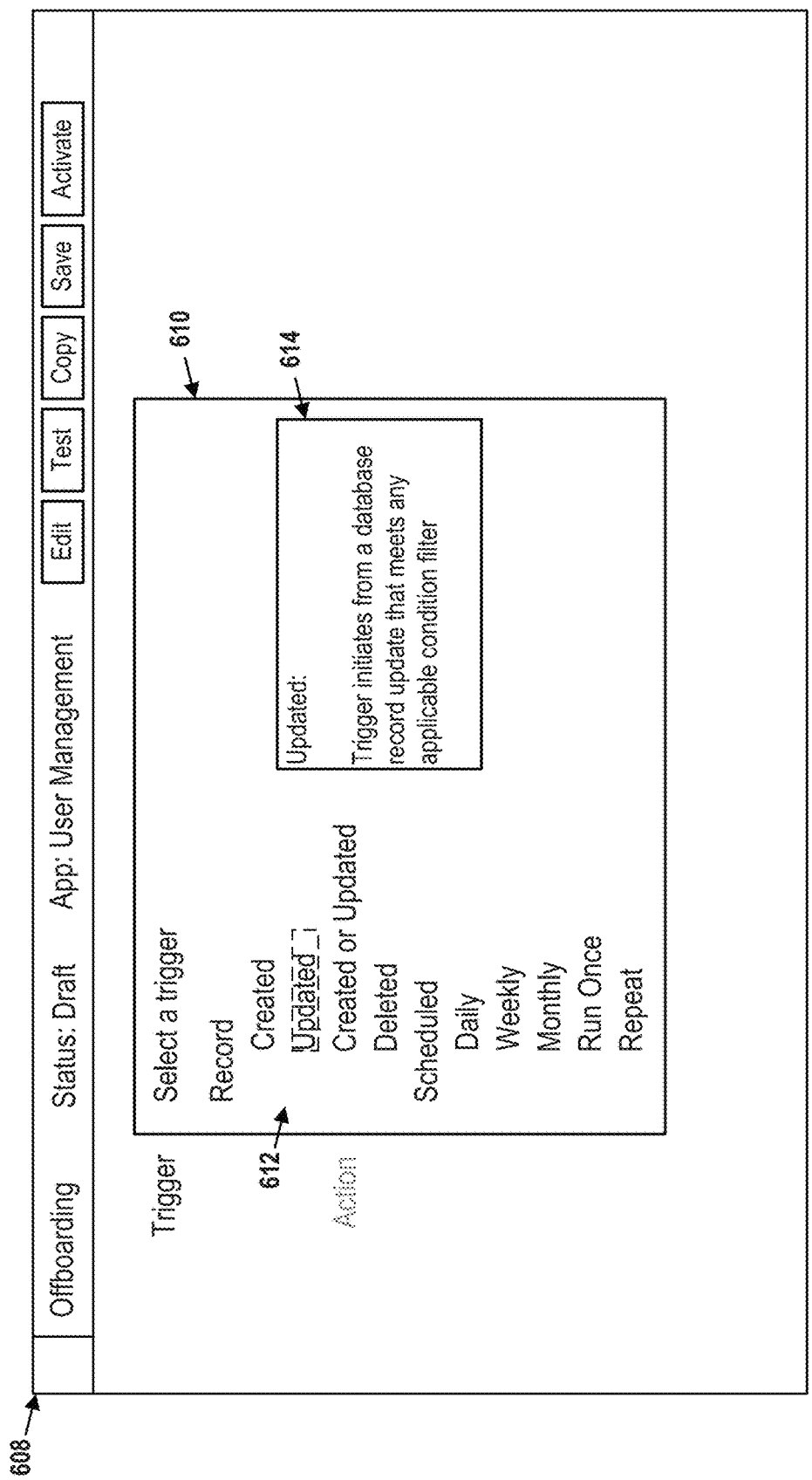

FIG. 6B depicts the first part of the trigger specification phase in GUI 608. The top of GUI 608 specifies the workflow's name, "Offboarding", as entered into window 606. This section of GUI 608 also indicates that this workflow is currently in draft form and is part of the "User Management" scoped application. GUI 608 further displays a series of buttons that allow a user to edit, test, copy, save, and activate the workflow, respectively. In alternative embodiments, different types of information about the workflow may be displayed, and there may be more or fewer buttons potentially with different functionality.

Notably, hashmarks are omitted from the background of GUI 608 (as well as all further GUIs) for purposes of readability. Also, the word "Trigger" is shown in a regular, dark color to indicate that a trigger is being specified, while the word "Action" is shown in a lighter color to indicate that action specification is not taking place.

Pop up window 610 (which, like window 606, may be a pane overlaid on top of GUI 608 and not a separate window), may allow a user to specify a trigger for the workflow. As noted previously, two main types of triggers may be supported and these types are shown in menu 612. Record-based triggers may cause a workflow to be performed when a change to one or more specific database records occurs. As depicted in menu 612, these changes may include creation of a record, updating of a record, creation or updating of a record, and deletion of a record. Scheduled triggers may cause a workflow to be performed at one or more specified times. As depicted in menu 612, such a schedule may trigger a workflow daily, weekly, monthly, just once (at a specified time), or to repeat at a user-specified interval.

In FIG. 6B, menu 612 indicates, with a dashed line, that the user has selected a trigger for when a record is updated. This may cause information box 614 to be displayed, which explains the behavior of the selected trigger.

Figure 6C:
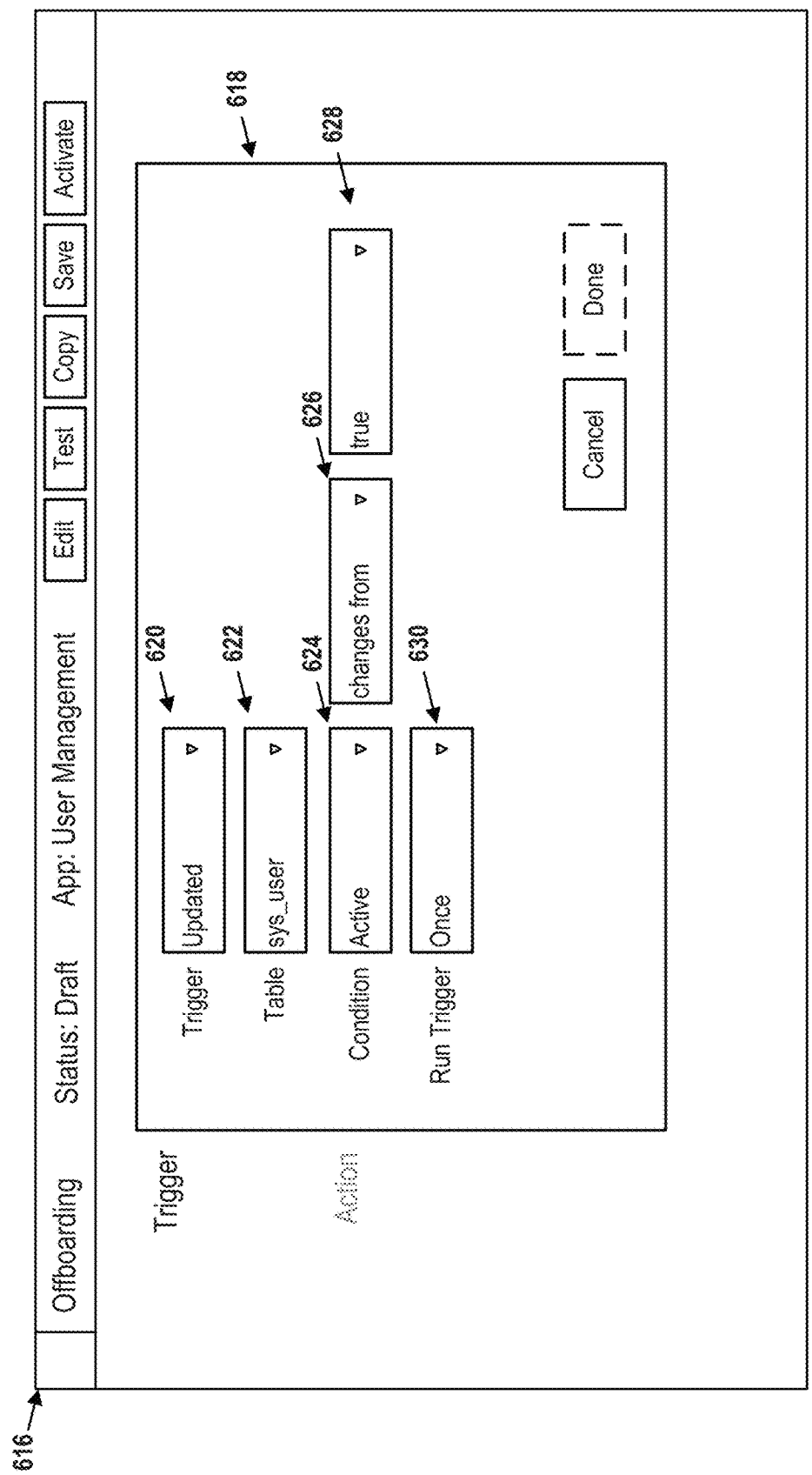

FIG. 6C depicts the second part of the trigger specification phase in GUI 616. GUI 616 assumes that the selection shown in FIG. 6B has been finalized. Thus, GUI 616 depicts pop up window 618 (which, like window 606, may be a pane overlaid on top of GUI 616 and not a separate window), that may allow a user to further specify a trigger for the workflow.

Window 618 contains a number of drop-down menus, some of which may be automatically populated based on the user's selection(s) from GUI 608. Particularly, trigger menu 620 may be populated to reflect the user's selection of the "Updated" option, and run trigger menu 630 may be populated to reflect that record-based triggers are expected to just run once. Nonetheless, the user may modify these selections in window 618.

Table menu 622 allows the user to specify a database table in which records can be found. As shown, this table is sys_user, which is assumed to contain one entry for each employee in the company. Table menu 622 may be capable of displaying a list of one or more available tables.

Condition menus 624, 626, and 628 allow the user to specify a condition of records in the selected table that will cause the workflow to be performed. This condition may be a state or a transition. For instance, condition menu 624 specifies "Active" to indicate that the records must be active, condition menu 626 specifies "changes from" to indicate records that change from active, and condition menu 628 specifies "true" to indicate any record that changes from active to another state.

In various embodiments, condition menu 624 may include entries for various fields in the sys_user table. These fields may include the phone number, building, city, department, address, manager, role, and so on. Condition menu 626 may include entries for "is", "is not", "is empty", "is not empty", "is anything", "is same as", "is different from" "changes", "changes from", "changes to", and/or various other logical operations. Condition menu 628 may include entries for items that are contextually based on the selections made for condition menus 624 and 626.

Viewed as a whole, the trigger specification of window 618 indicates that the workflow is to be performed once when any entry in the sys_user table is updated from active to another state (e.g., inactive). This would indicate that the user is no longer an active employee of the company.

Figure 6D:
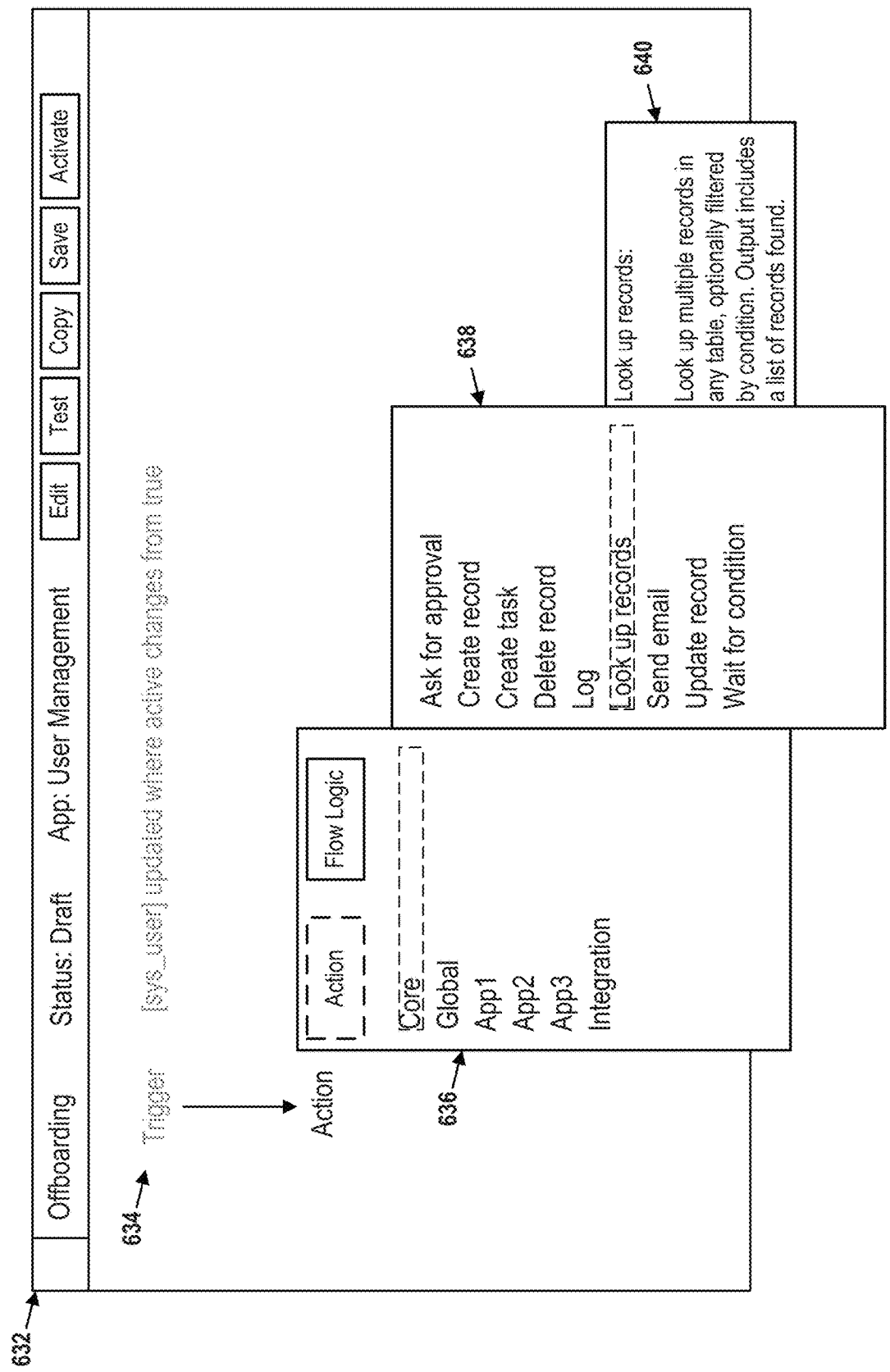

FIG. 6D depicts the first part of an action specification in GUI 632. Notably, at 634, the word "Trigger" is accompanied by a description of the trigger specified in FIGS. 6B and 6C. Further, this text is grayed in order to indicate that the trigger is no longer being specified.

As shown in menu 636, the user has the option of specifying an action or flow logic. The dashed line around the "Action" button indicates that an action is being specified. Particularly, menu 636 displays several contexts for the action being specified. For example, "Core" actions are supported by the computational instance as a default, while "Global" actions include all core actions, application-based, and integration-based actions. Application-based actions, "App1", "App2", and "App3", are actions supported by respective applications built on top of the remote network management platform. These may include, for example, various types of IT service management, IT operations management, customer service management, security operations, and CRM applications. Integration-based actions include actions defined by or supported by third-party applications integrated with the remote network management platform. These may include, for example, virtual chat applications, messaging applications, and so on. Each of these built-in or third-party applications may explicitly expose interfaces (referred to as "spokes") to the workflow design tool so that the workflow design tool can support workflows including data and/or functionality of these applications.

In FIG. 6D, the user has selected the "Core" context. Based on this selection, sub-menu 638 is displayed. This sub-menu provides the user the ability to select from a number of specific actions, such as "Ask for approval", "Create record", "Create task", "Delete record", "Log", "Look up records", "Send email", "Update record", and "Wait for condition". From these, the user has selected "Look up records". Accordingly, information box 640, that describes the selected action, may be displayed.

Figure 6E:
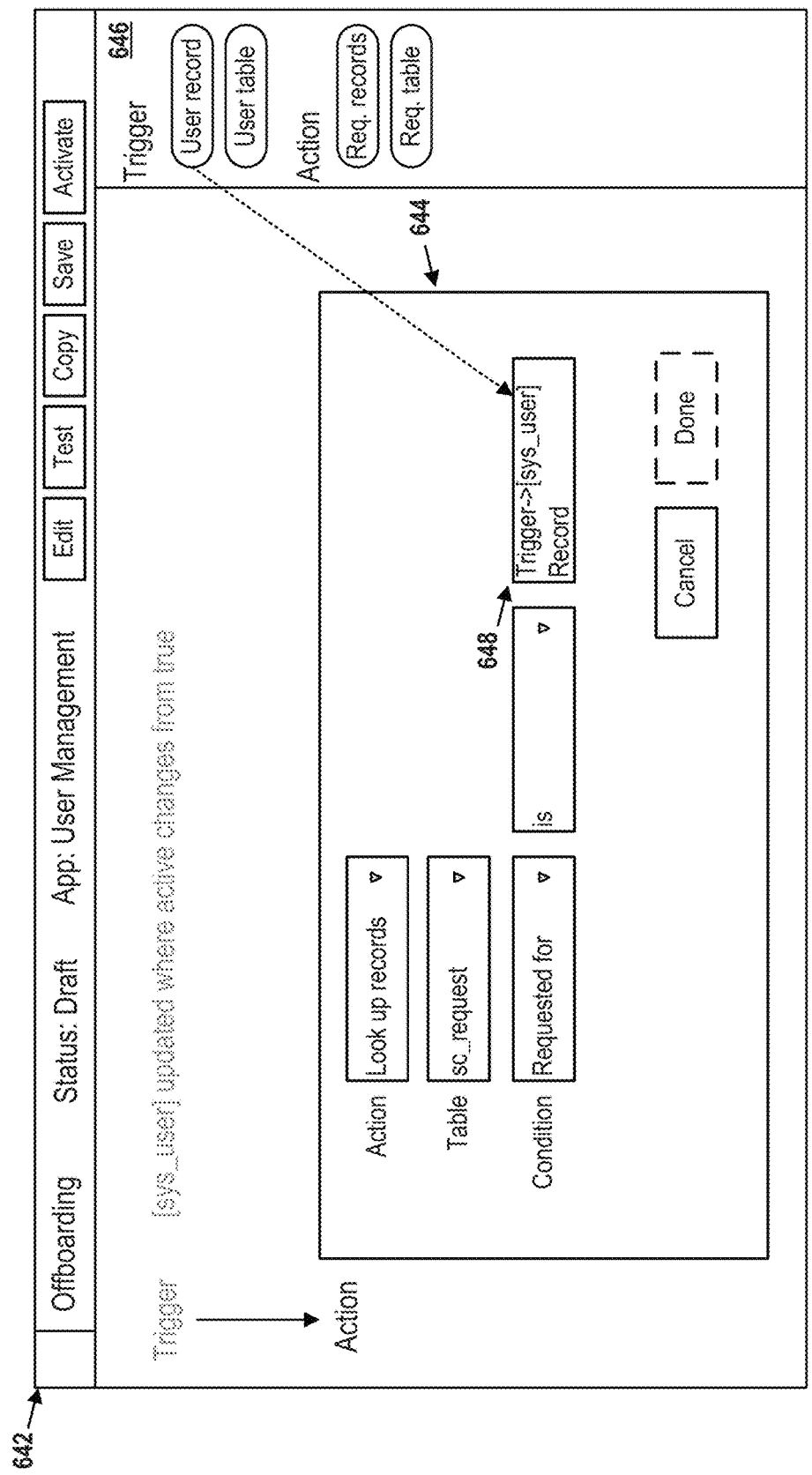

FIG. 6E depicts the second part of the action specification in GUI 642. Pop up window 644 (which, like window 606, may be a pane overlaid on top of GUI 642 and not a separate window), may allow specification of a table in which to look up records and the conditions that these records must meet. As shown in window 644, the action (as specified in FIG. 6D) is to look up records, and the table in which to perform this look up is sc_request (a table that contains catalog requests made by users). The records returned from sc_request are those where the "Requested for" field matches the user identified in the trigger step (i.e., a user whose active status has changed).

FIG. 6E also depicts column 646 containing pill-shaped user interface elements ("pills") arranged according to the previously-defined trigger as well as the action currently being defined. These pills are capable of being dragged from column 646 to the rightmost selectable item 648 in the condition field, as shown by the dotted arrow. User interface pills in this context are typically oval-shaped items that refer to data previously specified in the workflow and may be automatically placed in the user interface as this data is specified in the workflow design tool. In some embodiments, user interface chips or tags (with various shapes) may be used instead.

Notably, the two pills under the "Trigger" heading in column 646 refer to the user record(s) returned by the trigger (e.g., an entry in sys_user that changed from active to another state as specified in FIG. 6C) and the table upon which the trigger operates (e.g., sys_user as specified in FIG. 6C). The two pills under the "Action" heading in column 646 refer to the records found by the action being defined in FIG. 6E, as well as the table in which these records are located (e.g., sc_request).

The user interface elements, such as the pills in column 646, are a significant convenience for the user specifying the workflow, as they allow the user to easily include a reference to data or tables previously specified or referred to in the workflow. In this way, the user does not need to type in a specific reference to this information, and need only drag and drop a pill instead.

Once the user is satisfied with the information entered in window 644, the user may select or otherwise activate the "Done" button. This selection is denoted in FIG. 6E by this button being depicted with a dashed line. Once the user completes the dialog of window 644, the next phase of the workflow design tool, which allows the user to specify flow logic for the action, may be displayed.

Figure 6F:
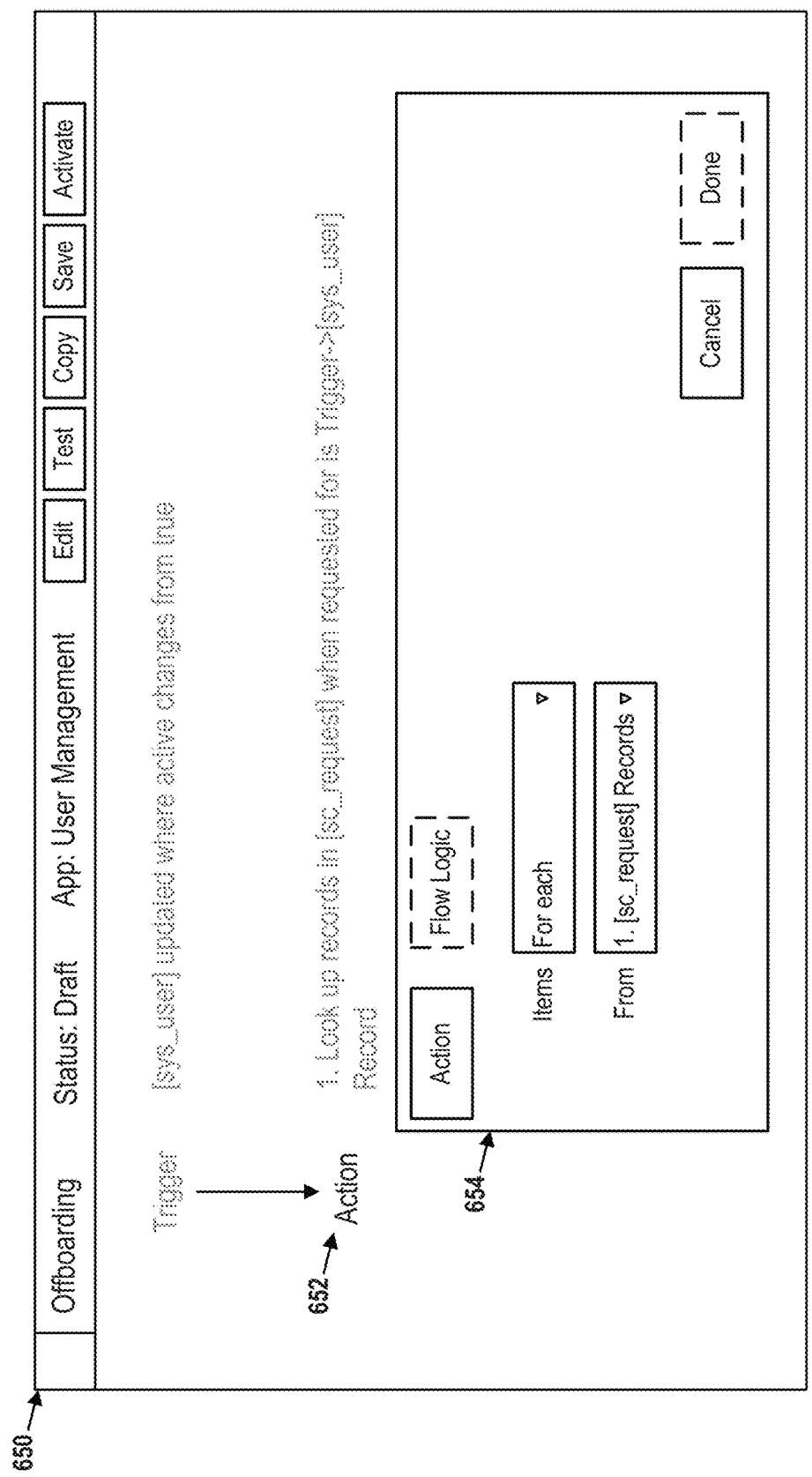

FIG. 6F depicts flow logic specification in GUI 650. Flow logic may be tied to an action, and specifies how the action is to be carried out. Notably, at 652 the word "Action" is annotated with a description of the action specified in FIGS. 6D and 6E.

Pop up window 654 may allow specification of whether the workflow operates on some or all items returned by the action specified in FIGS. 6D and 6E. The "Flow Logic" button is depicted with a dashed line to show that flow logic, rather than an action, is being specified. In this case, the selections made in window 654 indicate that the workflow operates on all items returned from the query specified in FIG. 6E. Notably, the "1. [sc_request] Records" value in the "From" field of window 654 indicates that the flow logic is to be applied to the output of Action 1, specified at 652. Notably, the value of the "From" field may be populated by a pill dragged and dropped from a column containing such pills. This column is not shown in FIG. 6F for purposes of simplicity, but may resemble column 646 of FIG. 6E.

Once the user is satisfied with the information entered in window 654, the user may select or otherwise activate the "Done" button. This selection is denoted in FIG. 6F by this button being depicted with a dashed line. Once the user completes the dialog of window 654, the next phase of the workflow design tool, which allows the user to specify a sub-action for the flow logic, may be displayed.

Figure 6G:
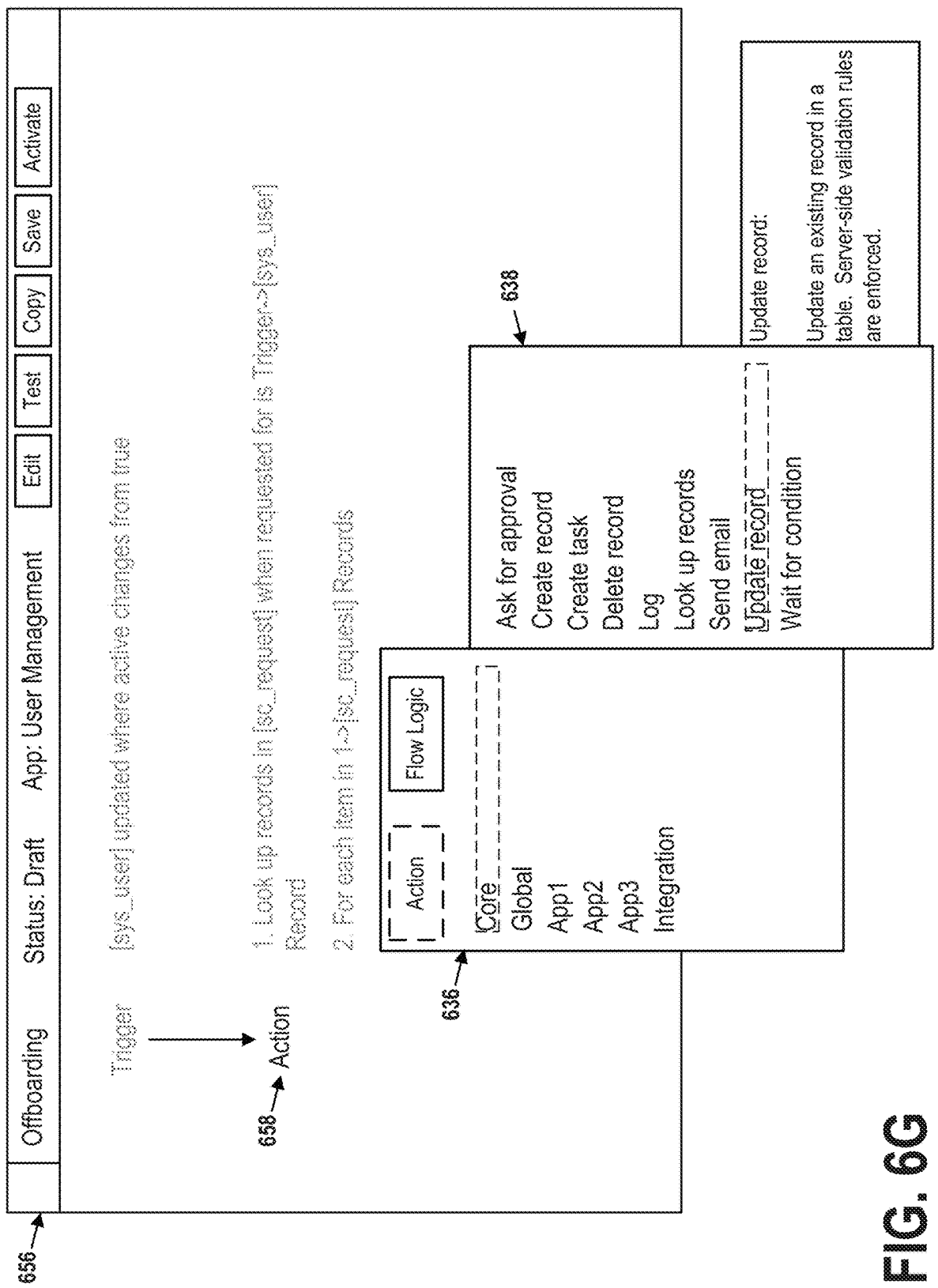

FIG. 6G depicts a sub-action specification in GUI 656. Notably, at 658, the word "Action" is accompanied by an updated description of the action and flow logic specified in FIGS. 6D, 6E, and 6F. Further, this text is grayed in order to indicate that the flow logic is no longer being specified. Notably, the sub-action specification once again displays menu 636 and sub-menu 638, this time with "Core" and "Update record" selected. Thus, GUI 656 depicts the user specifying that records will be updated for each item returned by the action defined in FIGS. 6D and 6E.

Figure 6H:
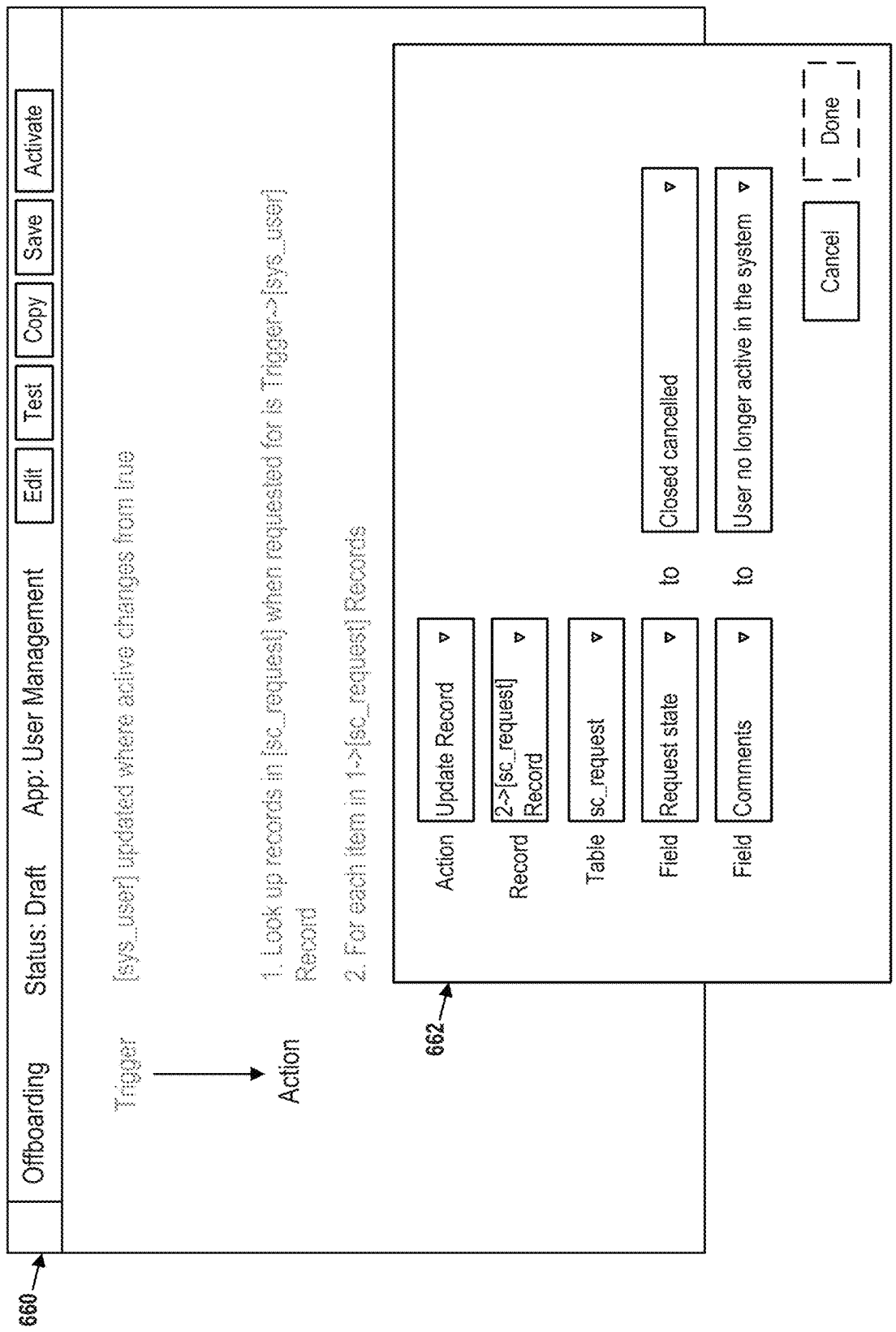

FIG. 6H continues this sub-action specification in GUI 660. Pop up window 662, may allow specification of actions to be taken on items returned by the flow logic specified in FIG. 6F. Particularly, the options shown in window 662 indicate that, for each record in the sys_user table that is returned by the trigger, any record in the sc_request table that was requested for the same user will be updated. The user also specifies two fields that are to be updated for matching records. The "Request state" field is to be updated to "Closed cancelled" to cancel the departed employee's pending catalog requests. The "Comments" field is also updated to "User no longer active in the system" to indicate why the request was cancelled.

Notably, the value of the "Record" field may be populated by a pill dragged and dropped from a column containing such pills. This column is not shown in FIG. 6H for purposes of simplicity, but may resemble column 646 of FIG. 6E.

Once the user is satisfied with the information entered in window 662, the user may select or otherwise activate the "Done" button. This selection is denoted in FIG. 6H by this button being depicted with a dashed line.

Figure 6I:
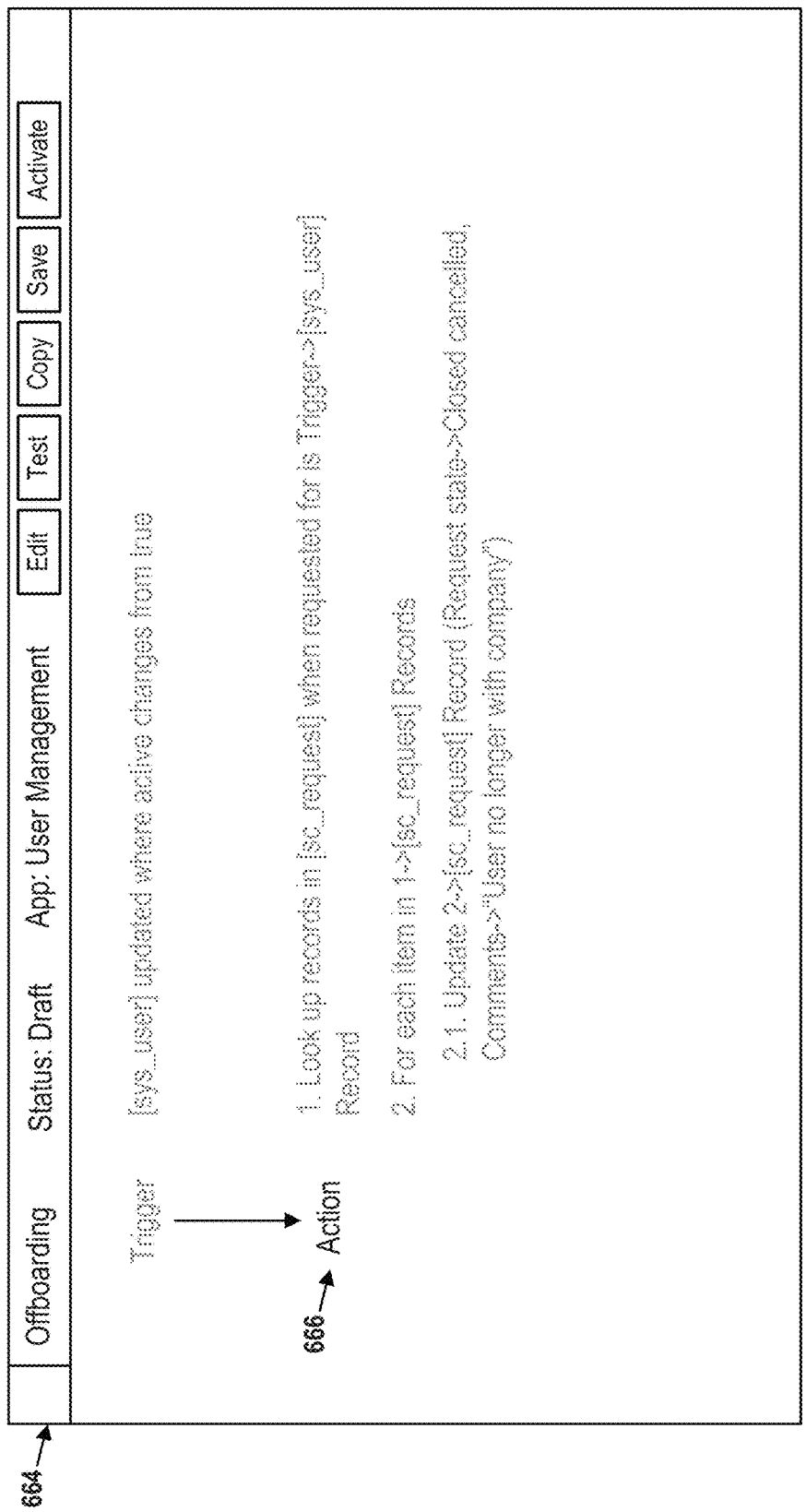

FIG. 6I shows GUI 664 depicting the workflow defined so far. At 666 the action specified in FIGS. 6D, 6E, 6F, 6G, and 6H is displayed. It is broken down into steps 1 (looking up records in the sc_request table that were requested for the employee identified by the trigger), 2 (for each these records, performing step/sub-action 2.1), and 2.1 (updating these records by closing them and adding an appropriate comment).

Figure 6J:
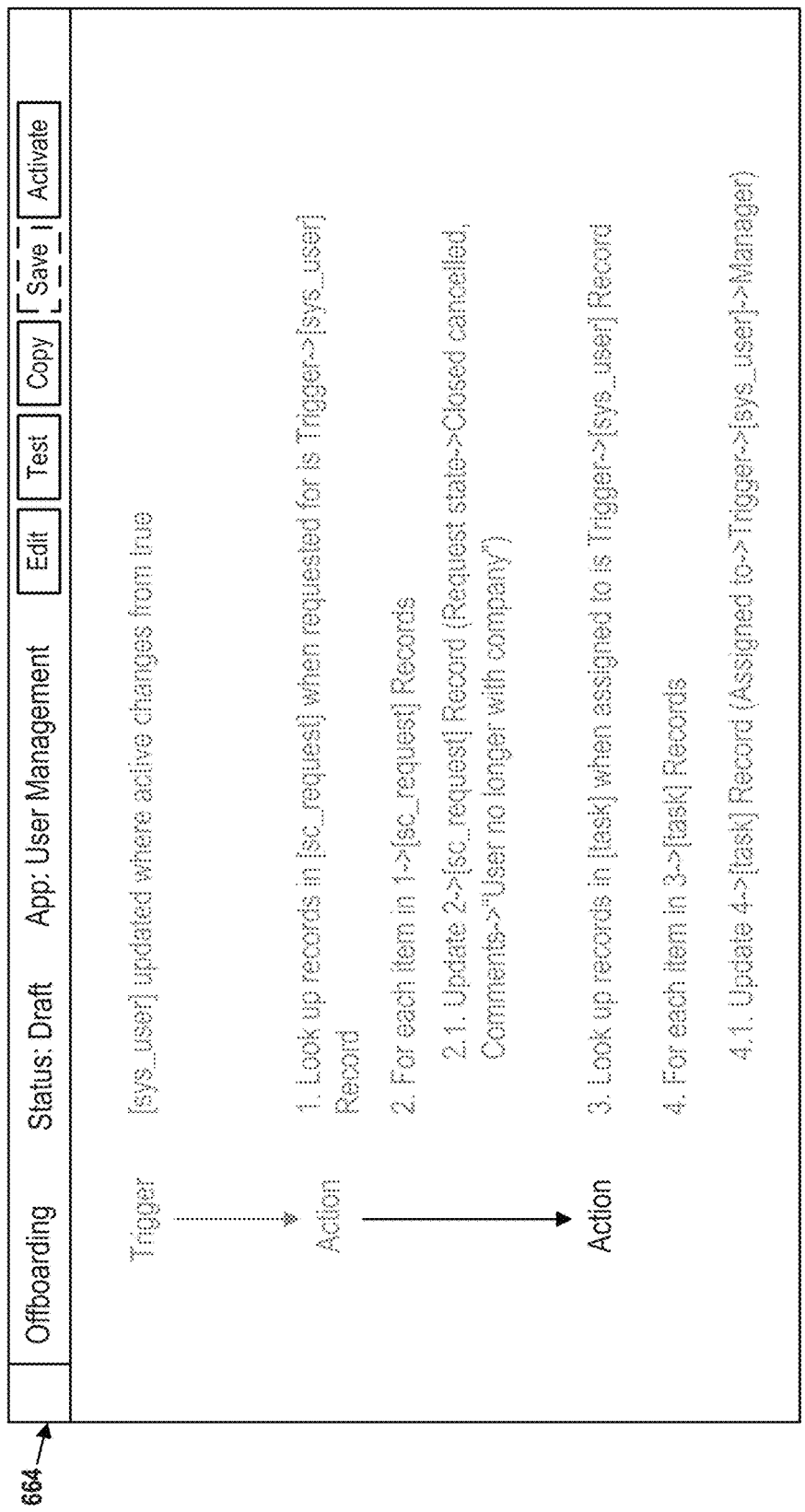

The rest of the desired workflow, as introduced above, also involves reassigning all tasks assigned to the departed employee to that person's manger. This further step is depicted in FIG. 6J. In order to avoid a degree of repetition, the GUIs for specifying the action, the flow logic, and the sub-action for task reassignment are omitted. Instead, FIG. 6J depicts GUI 664 updated to show the complete workflow.

Notably, step 3 looks up records in the task database table (which contains entries for tasks to be carried out by employees) that are assigned to the employee identified by the trigger. Step 4 specifies flow logic that, for each of these records, indicates that step/sub-action 4.1 is to be performed. Step 4.1 indicates that, for each record identified in step 4, the "Assigned to" field is to be changed to the manager of the identified employee.

In this way, arbitrarily complex flow-chart-like workflows can be rapidly designed in a data-centric fashion. The designer need not write any code, and is guided through the workflow specification by a series of GUIs that help the designer with appropriate menus and other interface elements. As a result, the designer saves a significant amount of time. In practice, experiments have shown that workflows can be specified in hours rather than the days typically needed for manually coding the workflows in a high-level programming language (e.g., JAVA®, JAVASCRIPT®, C++, and so on).

Another benefit of this workflow design tool is that it allows a workflow to be tested by the same GUI prior to deployment. FIG. 6K shows GUI 668, which contains the same information as GUI 660 from FIG. 6J, but also includes three columns reflecting the outcome of such a test. The "State" column indicates whether each step has been completed (in this example, all steps were completed), the "Start time" column indicates the time at which each step began, and the "Duration" column indicates how long each step took to be performed, in milliseconds. This allows the designer to verify that each step is properly performed, as well as to identify any steps that take an inordinate amount of time to complete. In alternative embodiments, other information may be displayed.

In the examples of FIGS. 6A-6K, a workflow is designed. The user persona that carries out such a process may be referred to as a workflow designer. However, actions may be designed in an analogous fashion (e.g., by way of similar GUIs) by a user with a persona of an action designer. Thus, an action designer may define custom actions that can be published, and published actions can be selected and incorporated into workflows by a workflow designer.

VI. An Action Design Tool with Dynamic Outputs

An action design tool with dynamic outputs facilitates dynamically retrieving, during workflow design, a definition of an API supported by a remote service. Doing so allows that API definition to be used to design the workflow to process and consume output from the remote service (e.g., values of data structure fields returned by the remote service). Common data formats, such as complex objects (JSON and/or XML), may be inherently supported. In many cases, this completely avoids, or dramatically reduces, the need for workflow designers to manually code parsing routines that transform complex objects or other formats supported by the API into data structures supported by the remote network management platform.

The action design tool may also support dynamic outputs—the ability to dynamically retrieve definitions of output formats from remote services during workflow design. Then, GUI-based representations of the fields can be visually arranged to facilitate, during workflow execution, automatic parsing of received complex objects.

These techniques may be referred to as "introspection," and represent an efficient mechanism for integrating remote services into enterprise workflows. In fact, the amount of time that a workflow designer needs to spend designing a workflow also decreases because the designer can simply drag and drop representations of outputs from calls to the remote service API into other actions. This is particularly helpful because most enterprises customize the data that they store to and retrieve from remote services (e.g., with specific fields). Thus, without dynamic introspection of remote service APIs at design time, each enterprise would have to develop specialized routines to support their respective customizations.

In particular, these embodiments assume that a remote service has two distinct APIs—a remote service API and a metadata API. The remote service API may be accessible by way of REST, SOAP, or some other mechanism, and may define ways in which structured data stored at the remote service can be queried. Thus, for example, a remote service storing a database table named "users" may make the content of this table (e.g., values stored in its columns) accessible by way of a REST API with a specific URL and set of query semantics.

The metadata API provides a definition of the structured data accessible by way of the remote service API (e.g., database tables and/or columns therein), as well as how to access this data. Thus, for example, the metadata API may have entries for each database table or other structured data accessible by way of the remote service API, as well as the associated URLs and query semantics. Example metadata API definitions can be provided in XML by the Web Services Description Language (WSDL), but other types of definitions are possible.

In practice, one can first query the metadata API to discover the definition of the remote service API. Then, one can query desired portions of the remote service API as needed. While these two APIs are considered to be separate for purposes of the discussion herein, they may be logically combined in implementations.

A. Design and Execution Phases

FIG. 7A is an overview of the metadata action design, integration action design, workflow design, and workflow execution phases as described herein. In various embodiments, these phases may contain more or fewer properties.

Metadata action design phase 700 allows a user to specify how to obtain the definition of the remote service API by way of a metadata API of the remote service. Since the definition of the remote service API, as well as the structured data provided thereby, may be unknown prior to querying the metadata API, the user may also specify how to parse and store a definition of the remote service API. For example, if the remote service API is defined in XML, the user may wish to parse this XML and convert it to another data format for storage. Thus, the user carrying out the metadata action design phase may require some degree of coding skill. Regardless, the metadata action, once defined, is saved and published for use by integration actions as a helper function. Example GUIs that support the metadata action design phase are shown in FIGS. 8A-8D.

Integration action design phase 702 allows a user to specify how to access structured data provided by a remote service API, as well as how to parse this structured data. In particular, the user may provide a definition of a URL from which the structured data can be obtained. The user may also indicate that the structured data is to be parsed by the metadata action defined in metadata action design phase 700. But unlike metadata action design phase 700, the user does not have to write parsing code (although the user can do so if desired), because the parsing is carried out by the metadata action. Still, the user may need to be conversant in use of the remote service API. The integration action is also saved and published for use in workflows. Example GUIs that support the integration action design phase are shown in FIGS. 9A-9D.

Workflow design phase 704 allows a user to specify a workflow. For example, the user may define a trigger event that causes the workflow to begin, as well as logical steps of the workflow (e.g., subflows, actions, etc.). One or more of these steps may incorporate previously defined integration actions. For example, an integration action defined in integration action design phase 702, when incorporated, may cause retrieval of the various types of dynamic output supported by the remote service API. A specific instance of this dynamic output (e.g., a specific table or other form of structured data) can be selected. A workflow defined in this fashion may be stored and possibly activated for later execution. The user need not write any code and also need not be conversant in the remote service API. Instead, the user can specify, through menu options of a GUI, structured data obtained from the remote service API and how to use it. Example GUIs that support the workflow design phase are shown in FIGS. 6A-6K and 10A-10C.

Workflow execution phase 706 may initiate manually or based on occurrence of a workflow's trigger event. This may cause a workflow defined workflow design phase 704 to be executed, with dynamic output parsed in accordance with the metadata action and the integration action.

Figure 7B:
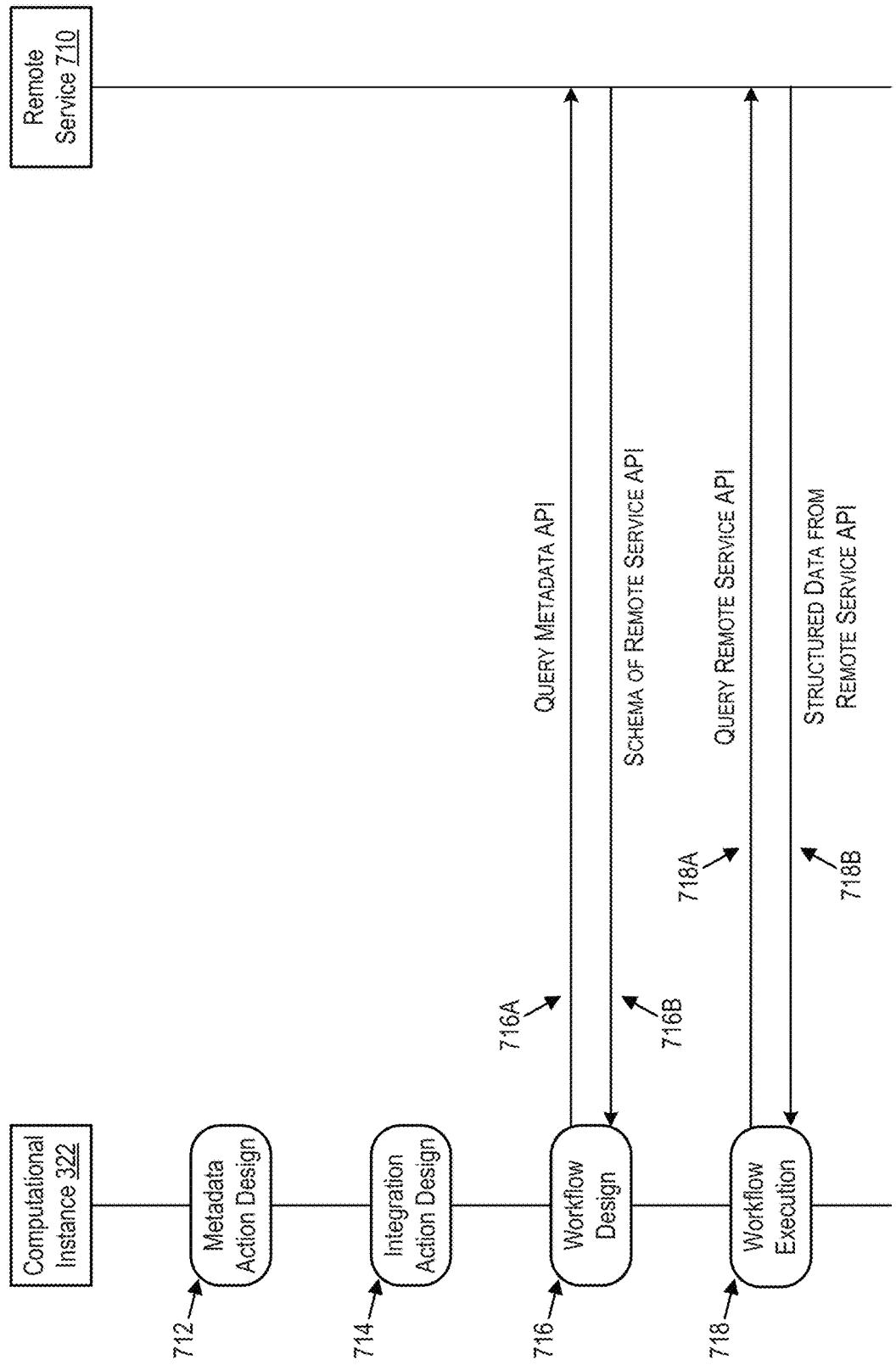
FIG. 7B is a message flow diagram for phases of metadata action design, integration action design, workflow design, and workflow execution, in accordance with example embodiments.

An example message diagram of metadata action design phase 700, integration action design phase 702, workflow design phase 704, and workflow execution phase 706 is shown in FIG. 7B. Computational instance 322 hosts a metadata action, an integration action, and a workflow. It is assumed that the integration action uses the metadata action to parse output from a remote service API of remote service 710, and that remote service 710 supports a metadata API that defines aspects of the remote service API. It is further assumed that the workflow incorporates the integration action.

At block 712, the metadata action is defined in accordance with metadata action design phase 700. At block 714, the integration action is designed in accordance with integration action design phase 702. At block 716, the workflow is also designed in accordance with workflow design phase 704.

When the integration action is incorporated into the workflow, computational instance 322 transmits query 716A to the metadata API of remote service 710. This query requests the definition (e.g., the schema) of the remote service API. Remote service 710 provides this definition in response 716B.

At block 718, the workflow executes. When the workflow reaches the integration action, computational instance 322 transmits query 718A to remote service 710. This query requests specific content from remote service 710, such as a number of records in a particular table, or the values of a particular column in a particular table. Remote service 710 provides the results of the query as structured data in response 718B. The metadata action is used to parse the structured data.

An advantage of these embodiments is that the workflow designer can define the workflow at a high level, without having to be concerned about how the structured data received from the remote service API is formatted or parsed. This allows workflows to be designed by users who are familiar with the goals of workflows without having to write code. Instead, metadata actions are defined for the remote service API by users with coding skills, and then reused across one or more integration actions. These integration actions are, in turn, defined by users who are familiar with the remote service API. The integration actions can be reused across multiple workflows. Thus, these embodiments facilitate the rapid development of workflows, including reuse of actions thereof, in a low-code or no-code fashion.

B. Metadata Design Phase

FIGS. 8A-8D depict GUIs usable to carry out the metadata design phase. These GUIs are provided for purposes of example, and may contain additional or alternative graphical elements or screens, and may be provided to the user in a different order. Ultimately, a goal of these GUIs is to logically guide the user through design of a metadata action. In this case, the metadata action uses the metadata API of the remote service to define how to parse output from the remote service API.

Figure 8A:
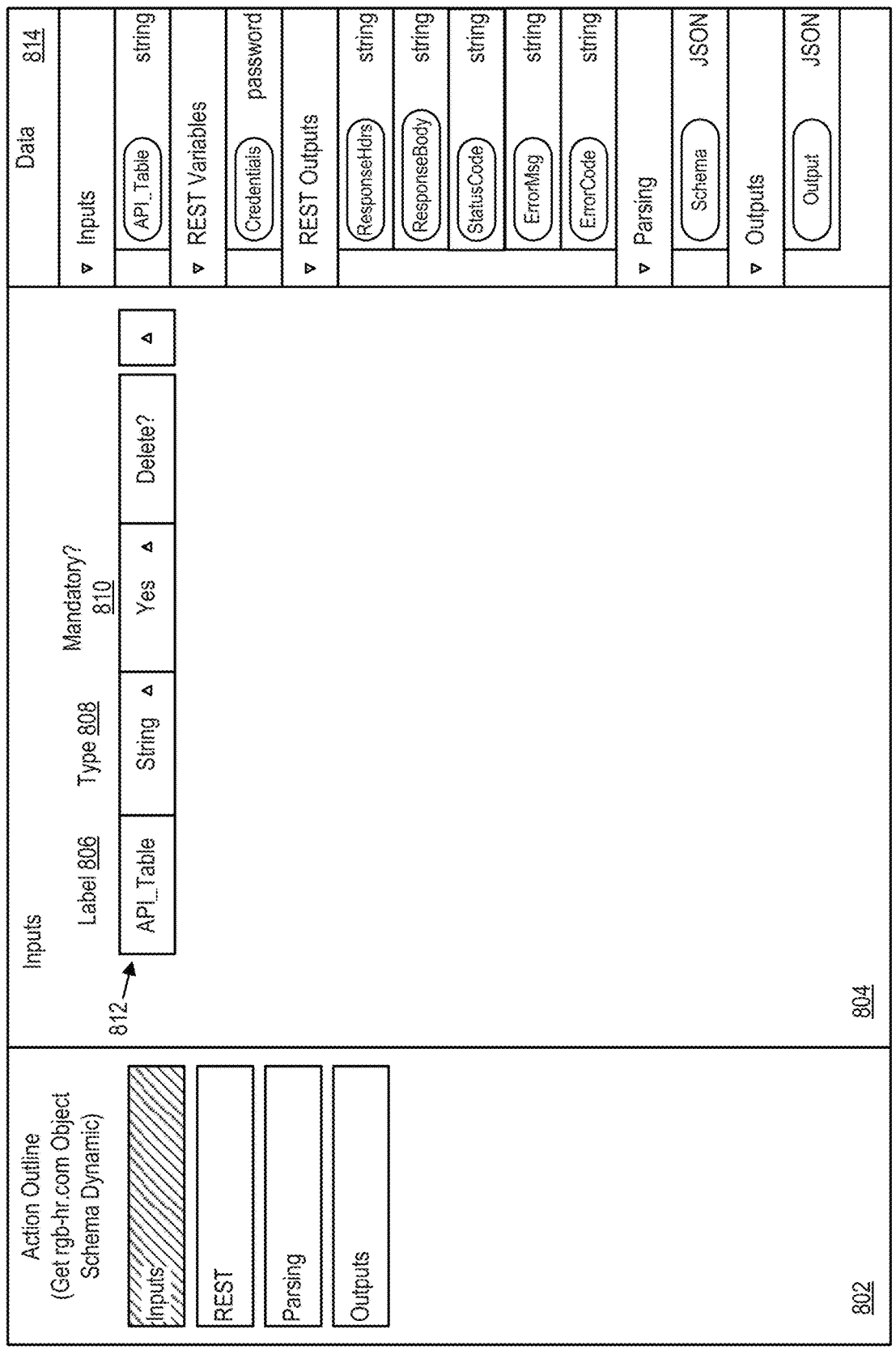
FIGS. 8A, 8B, 8C, and 8D depict graphical user interfaces for designing a metadata action, in accordance with example embodiments.
Figure 8B:
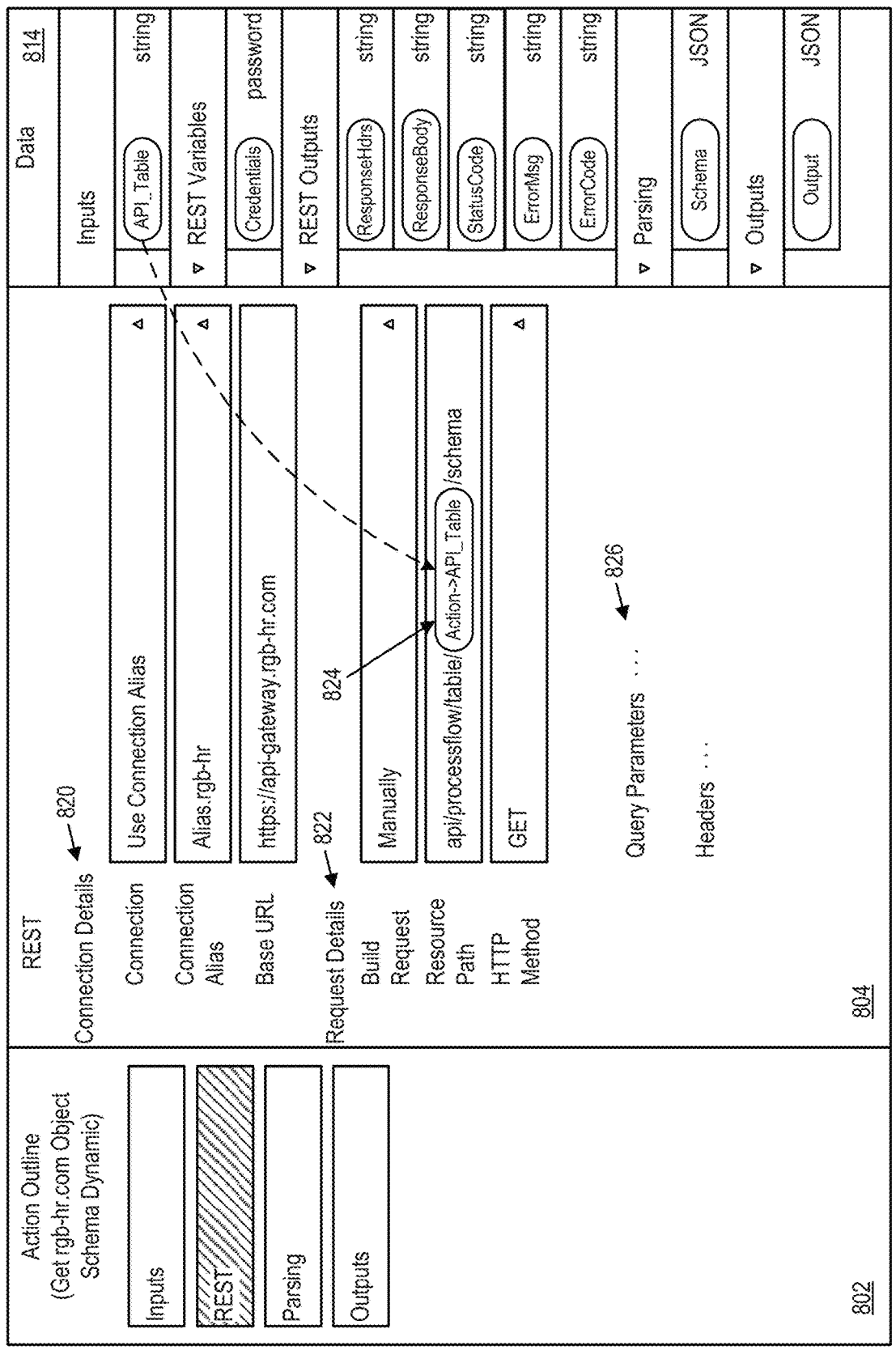
Figure 8C:
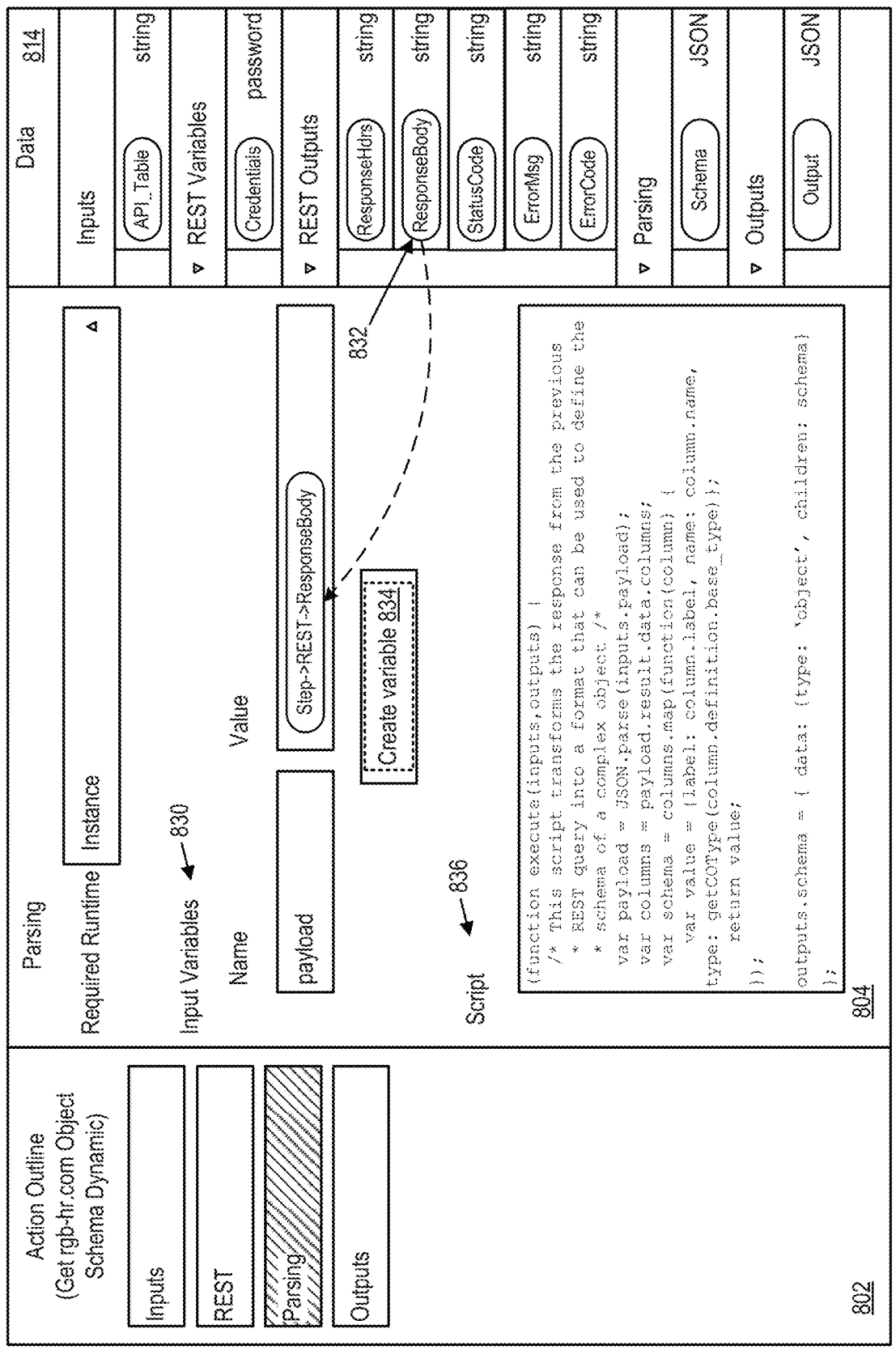
Figure 8D:
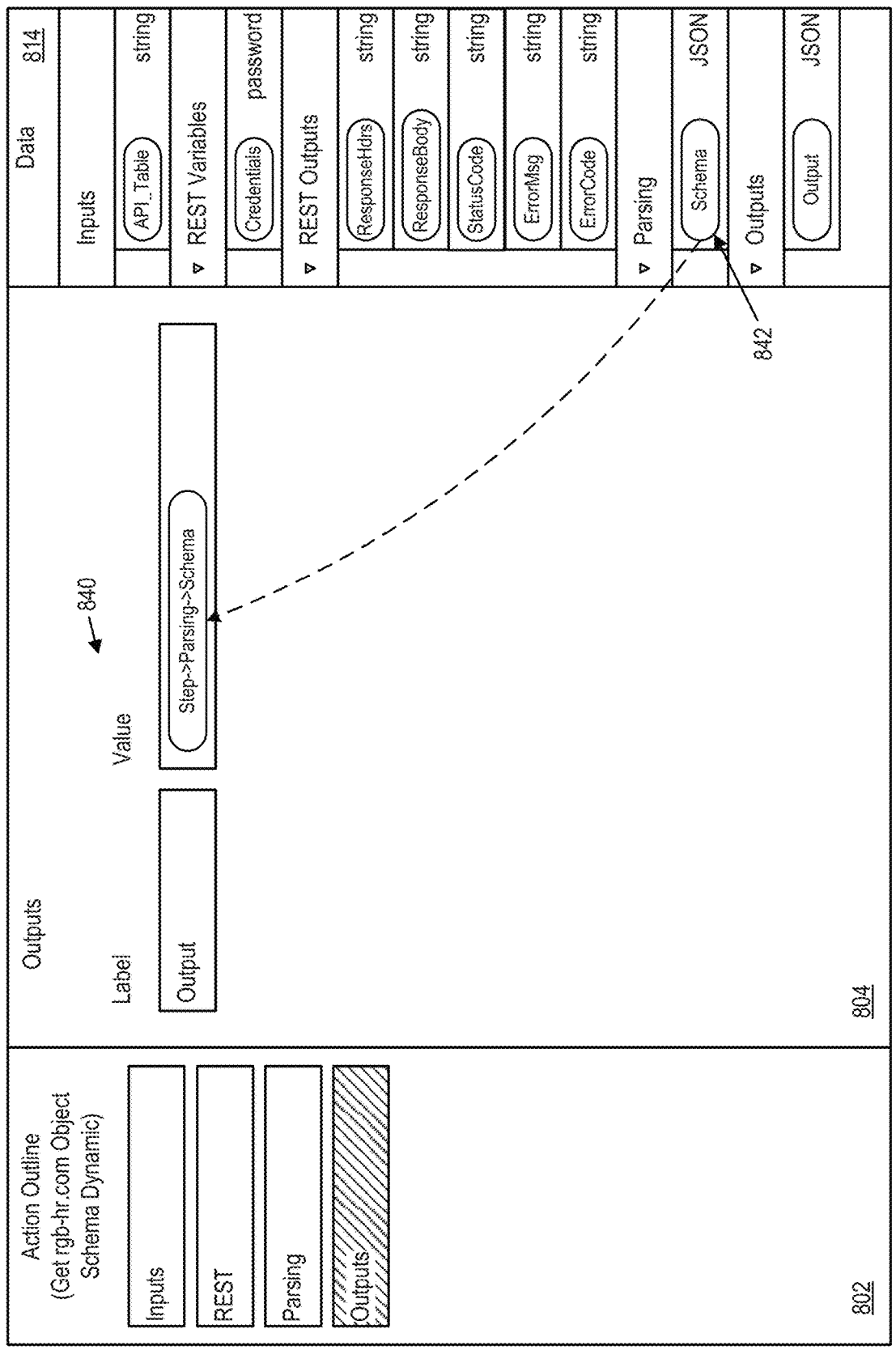

FIG. 8A depicts GUI 800, which includes action outline pane 802, specification pane 804, and data pane 814. Action outline pane 802 provides a listing of the steps involved with defining an action (in this case a metadata action), with the shaded step selected. In FIG. 8A, the "Inputs" block is shaded, indicating that the input step is selected. The user may select other blocks to switch to different steps of the metadata design phase, which are depicted in FIGS. 8B-8D. When switching between input blocks in action outline pane 802, the content of specification pane 804 may change accordingly. Action outline pane 802 also indicates that the action involves dynamically obtaining the rgb-hr.com remote service API schema. This indication may be text manually entered by the user to name or otherwise refer to the metadata action.

Specification pane 804 of FIG. 8A contains definitions of the inputs for the input step. Each input may be defined by label 806, type 808, mandatory indicator 810, and possibly other options not shown. Label 806 is a name for the input with which it can be referred. Type 808 is a data type of the input. For example, an integer, character, string, Boolean, or combinations thereof, may be supported. Mandatory indicator 810 determines whether the input is required in the metadata action. Entries for type 808 and mandatory indicator 810 may be dropdown menus with pre-defined options (e.g., integer, character, string, or Boolean for type 808 and yes or no for mandatory indicator 810). Each input may also have an associated delete button, activation of which causes the input to be removed from specification pane 804. As shown, input 812 is labeled "API_Table", is of type string, and is mandatory. This input may refer to a table accessible by way of the metadata API of the remote service that contains a definition of the remote service API. More than one input may be defined in this fashion.

Data pane 814 contains a hierarchical menu of data used by the metadata action. Each step (e.g., inputs, REST, parsing, and outputs) may have associated data displayed below one or more indicators of the step. In the embodiments shown, the individual units of data are represented as obround shapes, which may be colloquially referred to as "pills". These pills may be dragged from data pane 814 to various locations on inputs pane 804.

FIG. 8B depicts GUI 800 with the REST step selected in action outline pane 802. Thus, specification pane 804 includes graphical elements that define a REST query. In particular, specification pane 804 includes connection details 820 and request details 822. Connection details 820 defines a base URL, among other options. This base URL, "https://api-gateway.rgb-hr.com", refers to the remote service. Request details 822 defines a resource path, among other options. This resource path can be appended to the base URL to address a specific unit of structured data available by way of the metadata API. Request details 822 also indicates that the HTTP method is GET. Query parameters and headers 826 specify further parameters that can be appended to the resource path, as well as value of headers in the GET request.

Notably, pill 824 referring the "API_Table" input defined in FIG. 8A can be dragged and dropped into the resource path specification. This is a flexible way of referring to a particular table that facilitates the metadata API of the remote service.

FIG. 8C depicts GUI 800 with the parsing step selected in action outline pane 802. Thus, specification pane 804 includes graphical elements that define how to parse results of the REST query defined in FIG. 8B. In particular, input variables 830 define input to a user-defined script that parses the results, and script specifier 836 includes a text box in which the script can be entered and/or edited.

Each of input variables 830 is defined by a name and a value. For example, the input variable shown in FIG. 8C is named "payload" and the value is defined by pill 832. Notably, pill 832 refers to the ResponseBody parameter returned by the REST step. Pill 832 has been dragged and dropped into the value field, which indicates that the body of the response to the REST query (typically a JSON object) is to be parsed by the script. Script specifier 836 includes an example script that parses the expected JSON returned by the REST query into a normalized format or schema (not to be confused with the schema provided by the metadata API of the remote service). This format may be a data structure used by the computational instance to store arbitrary complex objects or structured data. While only one input variable is shown in FIG. 8C, additional input variables can be created by activating button 834.

FIG. 8D depicts GUI 800 with the outputs step selected in action outline pane 802. Thus, specification pane 804 includes graphical elements that define the output of the metadata action. In particular, variables 840 (of which there is only one in FIG. 8D) defines a variable labeled "Output" and an associated value. This value is defined by pill 842, which has been dragged and dropped into the value field. Notably, pill 842 refers to the schema parameter provided by the parsing step, and thus indicates that the output from the metadata action is the JSON output from the remote service as parsed into the schema. This provides a normalized format for the output.

In the context of FIGS. 8A-8D, other types of queries may be used in place of REST queries. For example, SOAP queries that return structured data formatted in accordance with XML may be used.

C. Integration Design Phase

FIGS. 9A-9D depict GUIs usable to carry out the integration design phase. These GUIs are provided for purposes of example, and may contain additional or alternative graphical elements or screens, and may be provided to the user in a different order. Ultimately, a goal of these GUIs is to logically guide the user through design of an integration action. In this case, the integration action queries the remote service API for a specified number of records from a specified table.

Figure 9A:
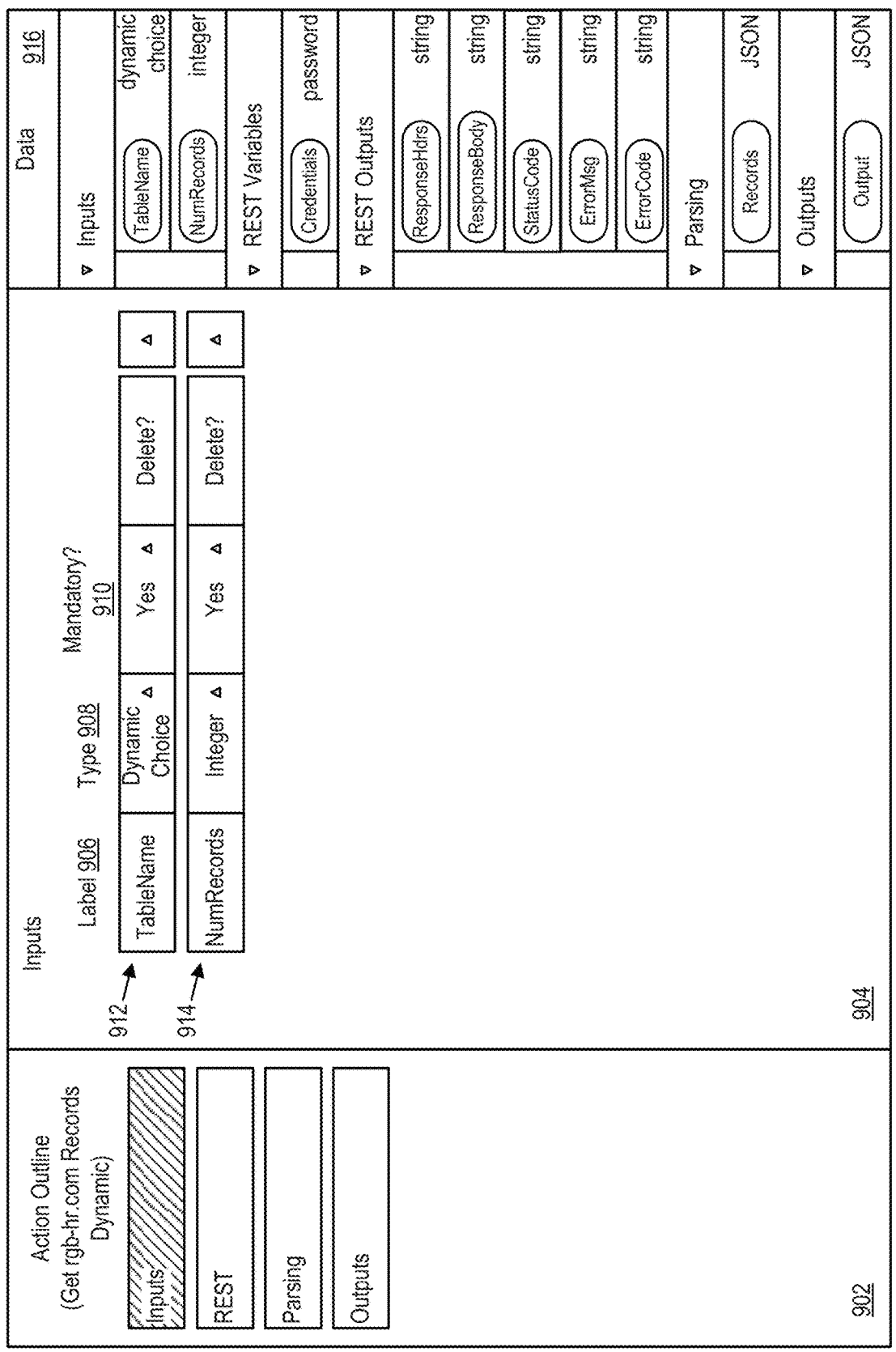
FIGS. 9A, 9B, 9C, and 9D depict graphical user interfaces for designing an integration action, in accordance with example embodiments.
Figure 9B:
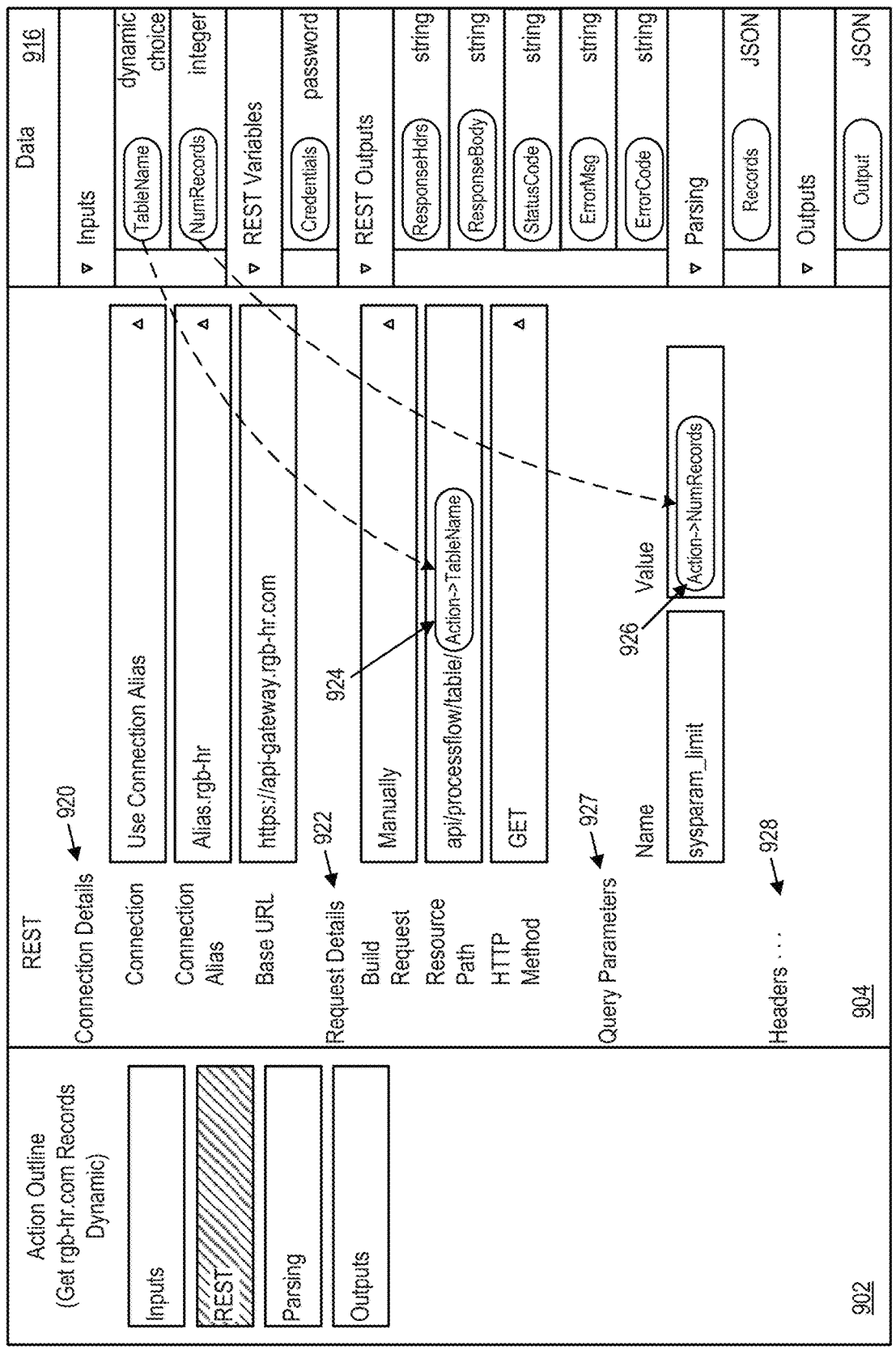
Figure 9C:
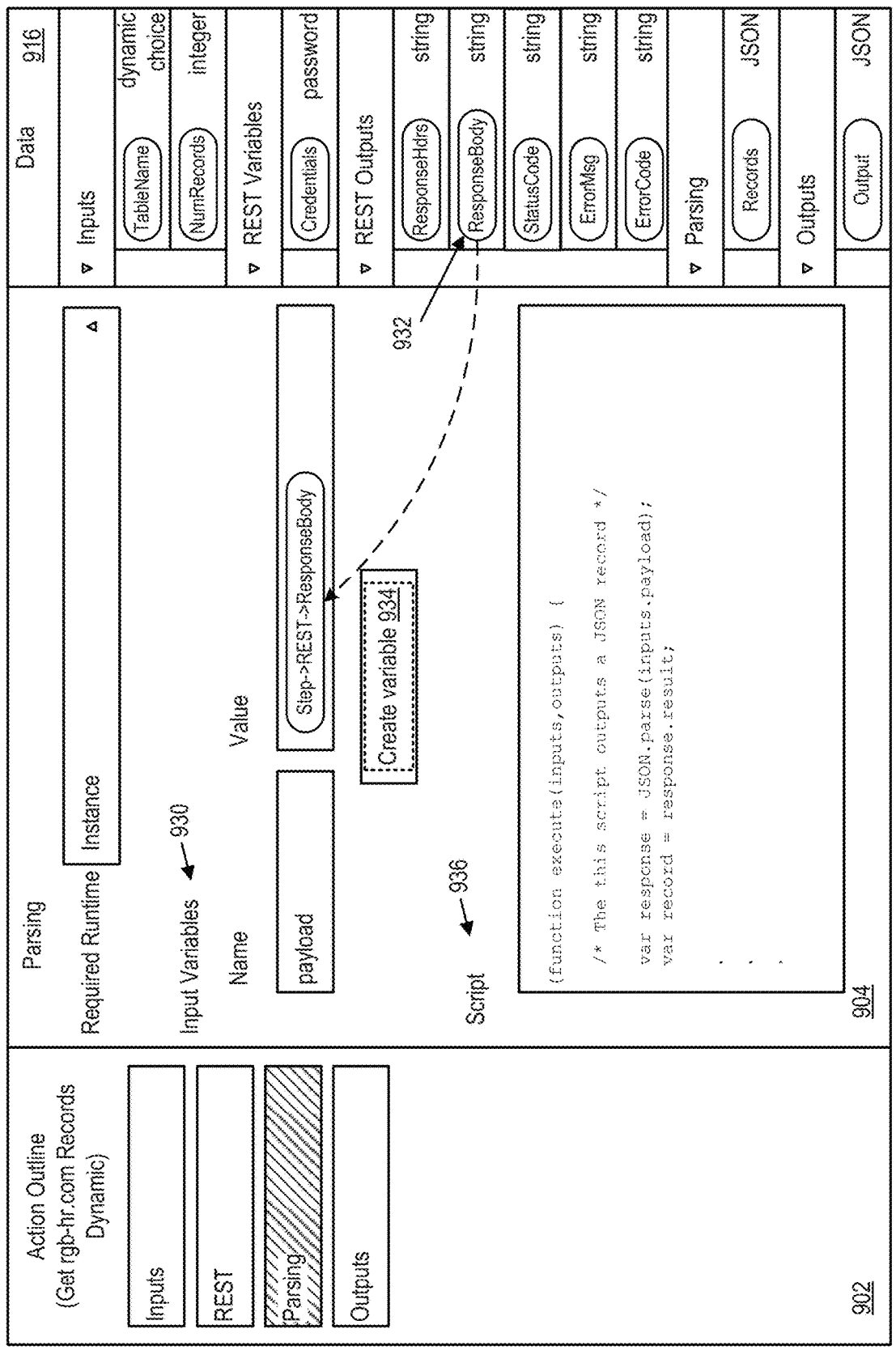
Figure 9D:
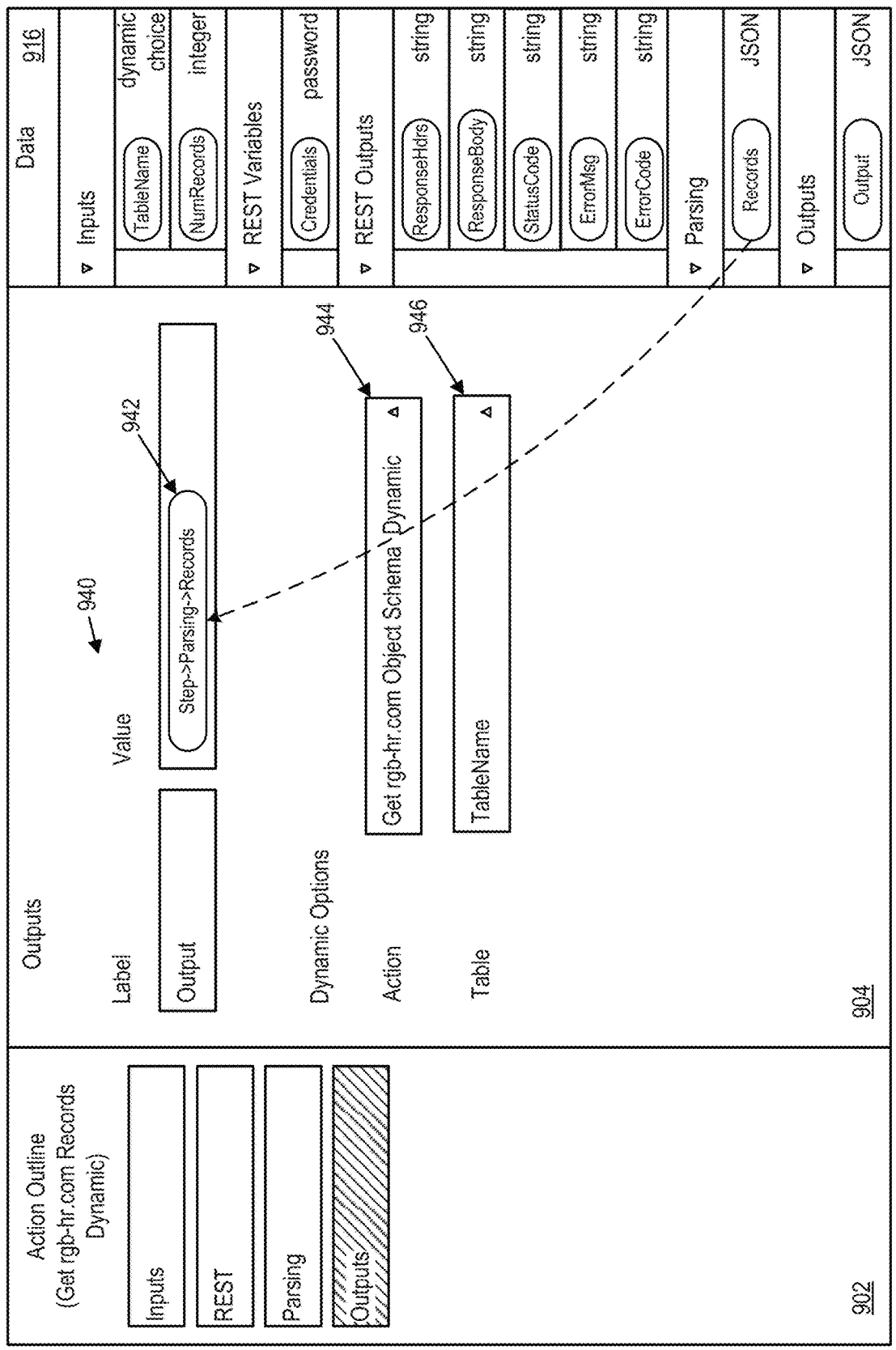

FIG. 9A depicts GUI 900, which includes action outline pane 902, specification pane 904, and data pane 916. Action outline pane 902 provides a listing of the steps involved with defining an action (in this case an integration action), with the shaded step selected. In FIG. 9A, the "Inputs" block is shaded, indicating that the input step is selected. The user may select other blocks to switch to different steps of the metadata design phase, which are depicted in FIGS. 9B-9D. When switching between input blocks in action outline pane 902, the content of specification pane 904 may change accordingly. Action outline pane 902 also indicates that the action involves dynamically obtaining rgb-hr.com records. This indication may be text manually entered by the user to name or otherwise refer to the integration action.

Specification pane 904 of FIG. 9A contains definitions of the inputs for the input step. Each input may be defined with by label 906, type 908, mandatory indicator 910, and possibly other options not shown. Label 906 is a name for the input with which it can be referred. Type 908 is a data type of the input. For example, an integer, character, string, Boolean, or combinations thereof, may be supported. Mandatory indicator 910 determines whether the input is required in the metadata action. Entries for type 908 and mandatory indicator 910 may be dropdown menus with pre-defined options (e.g., integer, character, string, or Boolean for type 908 and yes or no for mandatory indicator 910). Each input may also have an associated delete button, activation of which causes the input to be removed from specification pane 904. As shown, input 912 is labeled "TableName", is of type string, and is mandatory. This input may refer to a table accessible by way of the remote service API. Also, input 914 is labeled "NumRecords", is of type integer, and is mandatory. This input may refer to a maximum number of records to be obtained from a query of the table of input 912. More than two inputs may be defined in this fashion.

Data pane 916 contains a hierarchical menu of data used by the integration action. Each step (e.g., inputs, REST, parsing, and outputs) may have associated data displayed below one or more indicators of the step. In the embodiments shown, the individual units of data are represented as obround shapes, which may be colloquially referred to as "pills". These pills may be dragged from data pane 916 to various locations on inputs pane 904.

FIG. 9B depicts GUI 900 with the REST step selected in action outline pane 902. Thus, specification pane 904 includes graphical elements that define a REST query. In particular, specification pane 904 includes connection details 920 and request details 922. Connection details 920 defines a base URL, among other options. This base URL, "https://api-gateway.rgb-hr.com", refers to the remote service. Request details 922 defines a resource path, among other options. This resource path can be appended to the base URL to address a specific unit of structured data available by way of the remote service API. Request details 922 also indicates that the HTTP method is GET. Query parameters 927 defines further parameters that can be appended to the resource path. In FIG. 9B, this includes a parameter named "sysparam_limit", with is used to determine the maximum number of results to obtain from the REST query. Headers 928 specifies values of headers in the GET request.

Pill 924, referring to the "TableName" input defined in FIG. 9A, can be dragged and dropped into the resource path specification. This is a flexible way of referring to a particular table accessible by way of the remote service API. Additionally, pill 926, referring to the "NumRecords" input defined in FIG. 9A, can be dragged and dropped into the value field for the "sysparam_limit" parameter. This is a flexible way of referring to a maximum number of records to request from the remote service API. By making these inputs dynamic, the integration action can be used to retrieve any number of records from any table accessible by way of the remote service API.

FIG. 9C depicts GUI 900 with the parsing step selected in action outline pane 902. Thus, specification pane 904 includes graphical elements that define how to parse results of the REST query defined in FIG. 9B. In particular, input variables 930 define input to a user-defined script that parses the results, and script specifier 936 includes a text box in which the script can be entered and/or edited.

Each of input variables 930 is defined by a name and a value. For example, the input variable shown in FIG. 9C is named "payload" and the value is defined by pill 932. Notably, pill 932 refers to the ResponseBody parameter returned by the REST step. Pill 932 has been dragged and dropped into the value field, which indicates that the body of the response to the REST query (typically a JSON object) is to be parsed by the script. Script specifier 936 includes an example script that parses the expected JSON returned by the REST query into one or more records. While only one input variable is shown in FIG. 9C, additional input variables can be created by activating button 934.

In some embodiments the parsing step shown in FIG. 9C is not necessary and may be omitted. In these cases, the outputs step may operate directly on the results of the REST query of the REST step.

FIG. 9D depicts GUI 900 with the outputs step selected in action outline pane 902. Thus, specification pane 904 includes graphical elements that define the output of the integration action. In particular, variables 940 (of which there is only one in FIG. 9D) defines a variable labelled "Output" and an associated value. This value is defined by pill 942, which has been dragged and dropped into the value field. Notably, pill 942 refers to the records parameter provided by the parsing step, and thus indicates that the output from the integration action is the JSON output from the remote service as parsed.

Specification pane 904 also includes action 944 and table 946. Action 944 indicates that the metadata action is to be used to query the metadata API in order to obtain a definition of the remote service API (e.g., the tables available thereby). Thus, the metadata action can be thought of as a "helper function" for the integration action. Table 946 indicates that the TableName parameter is also dynamic. As indicated in FIG. 9D, the values of action 944 and table 946 can be selected from respective drop-down menus.

In the context of FIGS. 9A-9D, other types of queries may be used in place of REST queries. For example, SOAP queries that return structured data formatted in accordance with XML may be used.

D. Workflow Design Phase

Figure 10A:
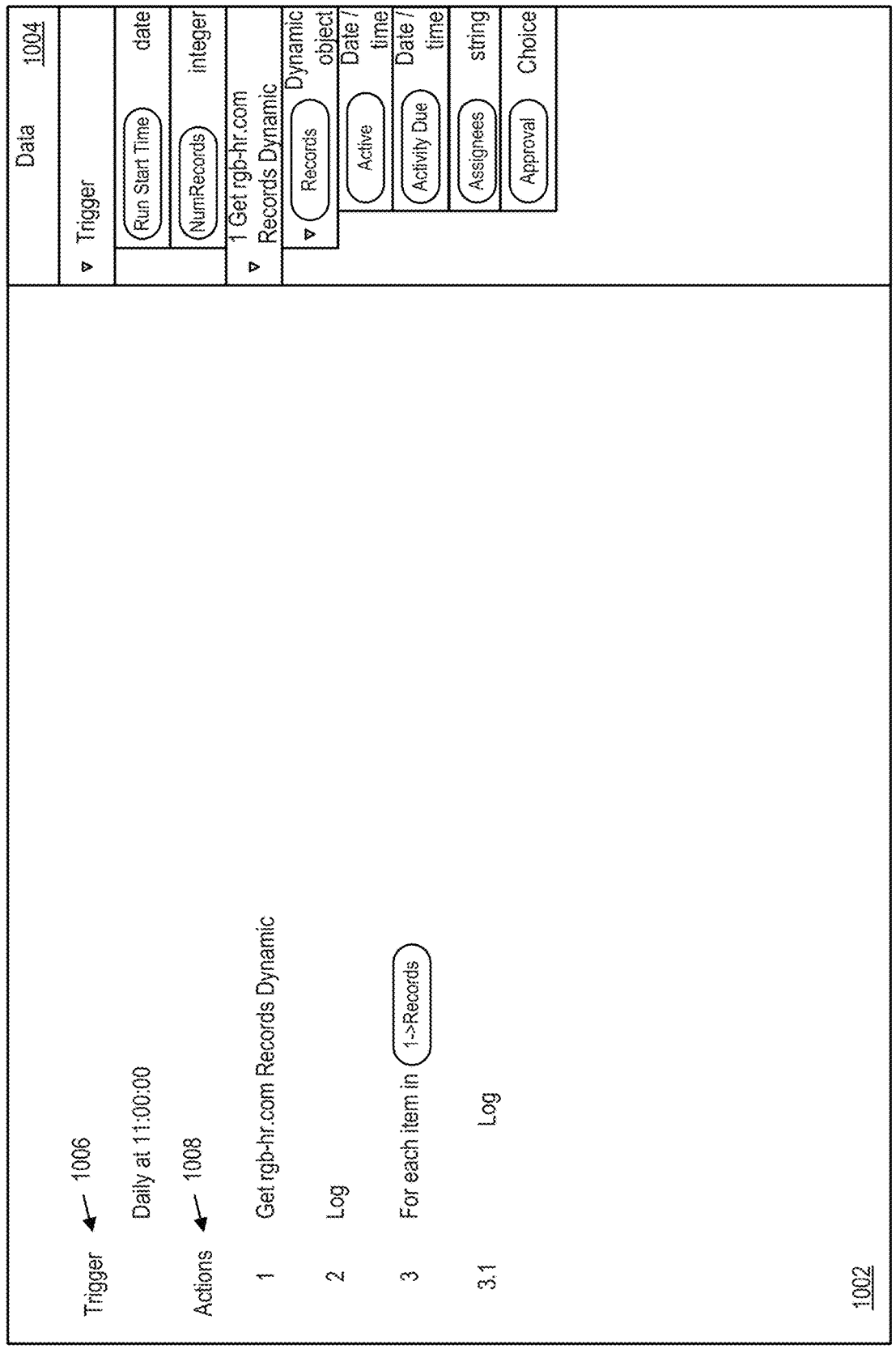
FIGS. 10A, 10B, and 10C depict graphical user interfaces for designing a workflow, in accordance with example embodiments.
Figure 10B:
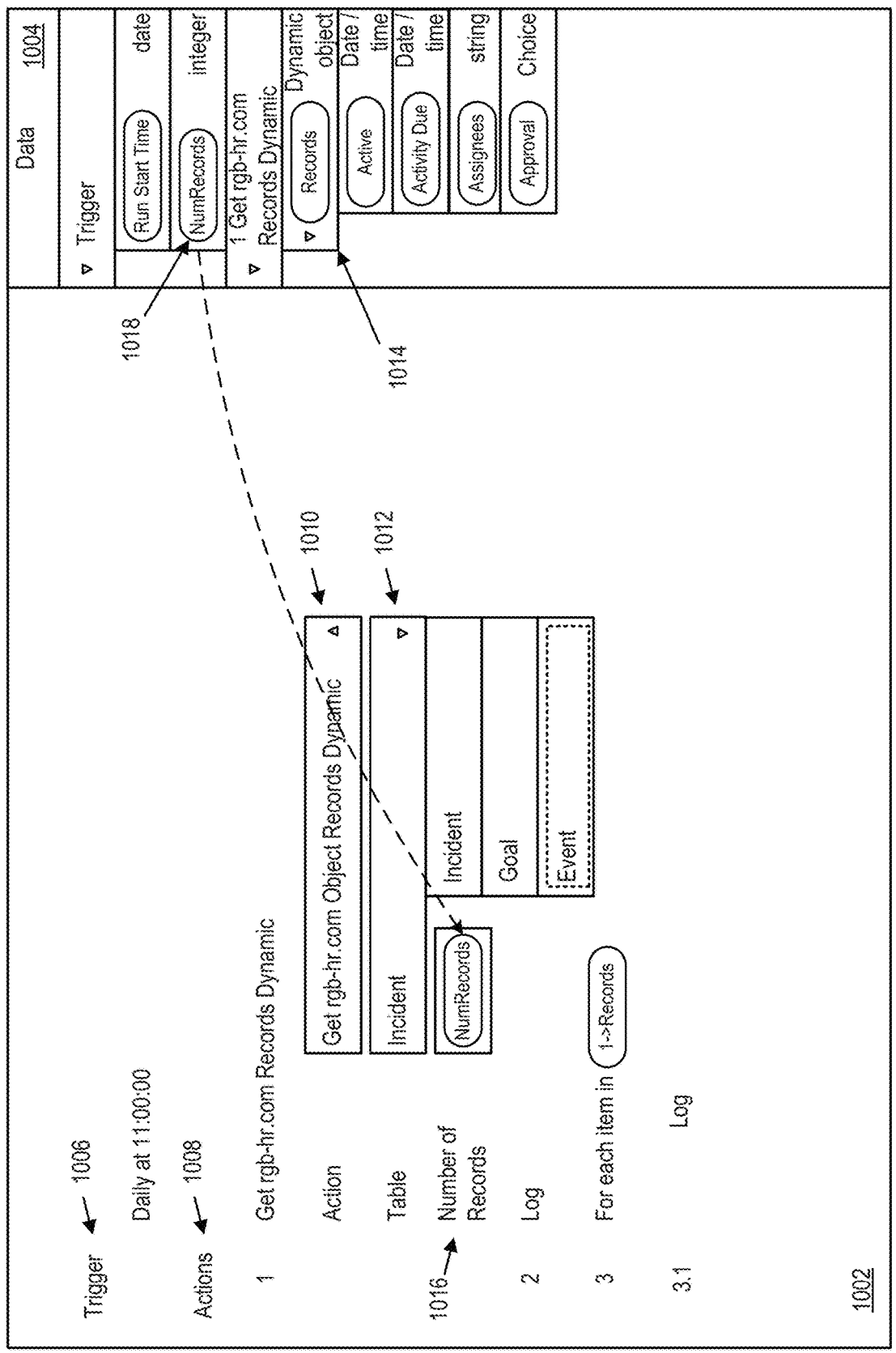
Figure 10C:
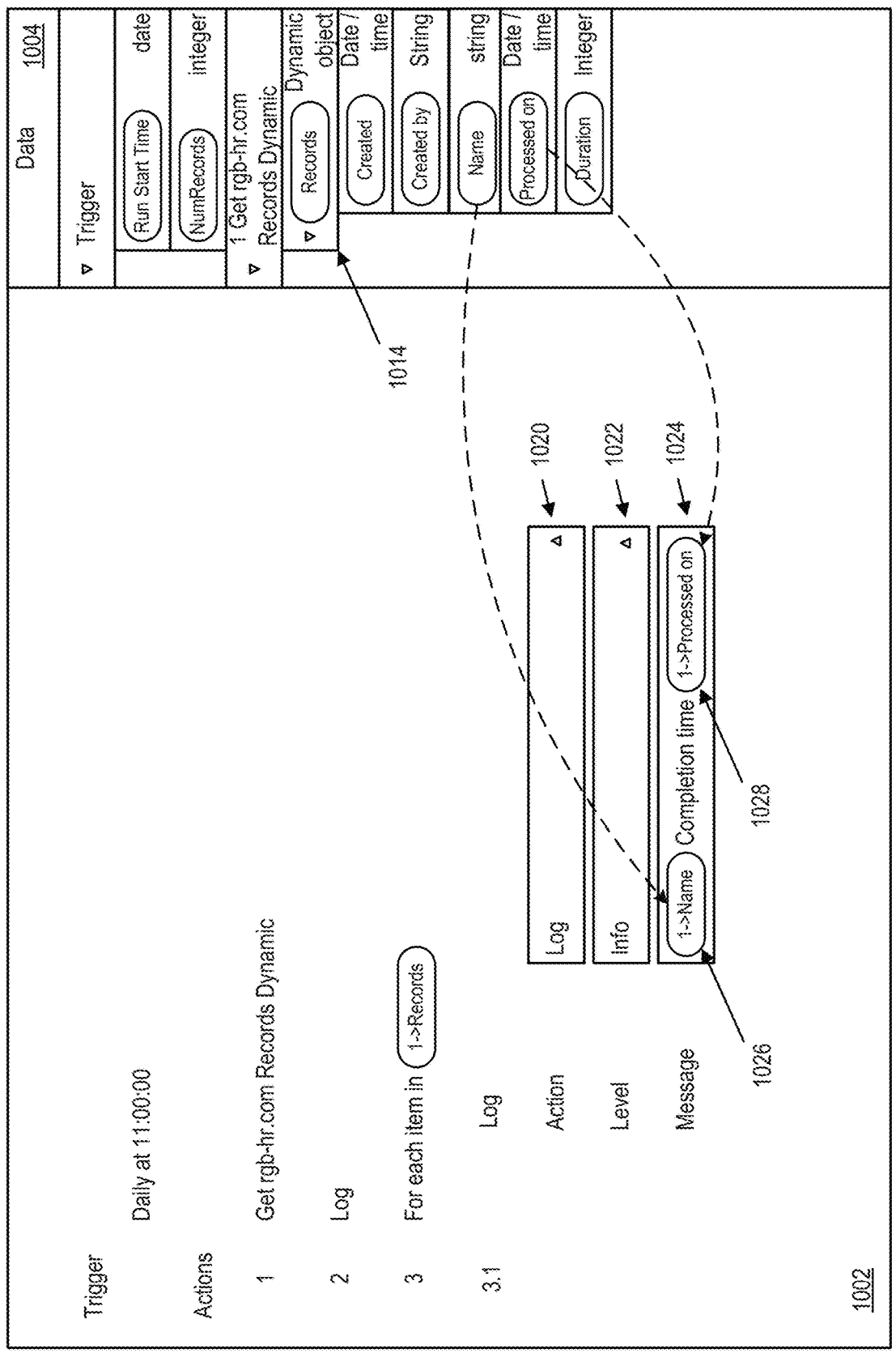

FIGS. 10A-10C depict GUIs usable to carry out the workflow design phase. These GUIs are provided for purposes of example, and may contain additional or alternative graphical elements or screens, and may be provided to the user in a different order. Ultimately, a goal of these GUIs is to logically guide the user through design of a workflow. In this case, the workflow includes the integration action to query the remote service API for a specified number of records from a specified table. During workflow design, the user can dynamically determine the tables available from the remote service API, and can drag and drop pills representing the output of integration action queries into subsequent steps of the workflow.

Notably, the workflow of FIGS. 10A-10C is more focused than the general, introductory workflow of FIGS. 6A-6K. Thus, the workflow of FIGS. 10A-10C may include additional steps and features not shown. Particularly, any features present in workflow of FIGS. 6A-6K can be added to the workflow of FIGS. 10A-10C.

FIG. 10A depicts GUI 1000, which includes workflow pane 1002 and data pane 1004. Workflow pane 1002 provides an outline of parts of a workflow, and may include buttons or other graphical elements (not shown) that allows a user to add, remove and/or edit any of these parts. For example, trigger 1006 indicates that the workflow is to execute daily at 11 am.

Trigger 1006 is followed by an enumerated listing of actions 1008. Action 1 involves invoking the integration action (e.g., defined as shown in FIGS. 9A-9D). This integration action transmits a REST query requesting a particular number of records from a particular table accessible by way of the remote service API. Action 2 involves logging at least some information. This information may be, for example, the name of the table queried among other possibilities. Action 3 defines a loop over a subflow. The loop involves performing the subflow's actions on each of the records returned by action 1. Action 3.1 is within the subflow (e.g., any action enumerated as 3.x may be considered to be within the subflow of action 3). As will be described below, action 3.1 logs specific information from each of the records.

Data pane 1004 contains a hierarchical menu of data used by the workflow presented in the normalized format defined by the metadata action. Each part (e.g., the triggers and actions) may have associated data displayed below one or more indicators of the part. In the embodiments shown, the individual units of data are represented as pills. These pills may be dragged from data pane 1004 to various locations on workflow pane 1002.

FIG. 10B depicts GUI 1000 with action 1 expanded. The user may have actuated GUI 1000 on or near action 1, for example, or may have selected action 1 in some other fashion. Regardless, action 1 has been expanded to display its parameters.

Particularly, action selector 1010 defines the nature of action 1. In this case, action 1010 refers to the integration action of FIGS. 9A-9D. Action selector 1010 uses a drop-down menu for selection, so other actions may have been selected instead.

Table selector 1012 specifies a table accessible by way of the remote service API. During the specification of action 1008, the metadata action may have been triggered to query the metadata API of the remote service for a list of tables. The columns of the table selected by table selector 1012 may be automatically populated in the hierarchy of data pane 1004. Notably, the part of the hierarchy under dynamic object 1014 is populated with columns from the specified incident table. Table selector 1012 uses a drop-down menu for selection, so other actions may have been selected instead. For example, FIG. 10B shows the event table about to be selected from the drop-down menu.

Records selector 1016 allows specification of the number of records to retrieve from the table specified by table selector 1012 during the integration action specified by action 1. Notably, pill 1018 has been dragged and dropped into this parameter, indicating that the number of records specified in trigger 1006 will be used in records selector 1016.

FIG. 10C depicts GUI 1000 after the event table is selected in table selector 1012. Selection of the event table has caused the hierarchy under dynamic object 1014 to be populated with columns from the event table. Doing so may involve querying the metadata API for a definition for the schema of the remote service API (or just the schema of the event table). Also, the user has actuated GUI 1000 on or near action 3.1, for example, or may have selected action 3.1 in some other fashion. Regardless, action 3.1 has been expanded to display its parameters.

The expansion of action 3.1 includes action selector 1020, level selector 1022, and message selector 1024. Action selector 1020 indicates that the log action is selected, which is also reflected in the label of action 3.1. Other actions may be selected for action selector 1020 by actuating its drop-down menu. Level selector 1022 and message selector 1024 are specific to the log action and may be replaced with other selectors should a different action be selected in action selector 1020.

Level selector 1022 is a drop-down menu that allows selection of a log level. Its options may include error, warning, info, and debug, among other possibilities. Message selector 1024 allows the user to specify a message format for displaying in logs. In FIG. 10C, pills 1026 and 1028 have been dragged and dropped into message selector 1024. Thus, each log entry may contain an indication of the log level (as shown by level selector 1022), the value of the name column in the event record, the text "Completion time", and the value of the processed on column in the event record.

When considered as a whole, the workflow designed in FIGS. 10A-10C would be triggered at 11 am each day, and would retrieve a number of records from the event table accessible by way of the remote service API. The number of records to retrieve would be defined in an input to the trigger. Some general information would be logged (action 2 does not specify these details nor are they particularly critical for purposes of this discussion). Then, for each record retrieved, content therein would be logged in accordance with action 3.1.

Advantageous, if the workflow designer can change the table in action 1 to a different table, and the columns of the different table may be dynamically presented as pills in data pane 1004. These pills (representing dynamic outputs of the remote service API) can be dragged and dropped into inputs of subsequent actions of the workflow. Consequently, the embodiments herein provide a flexible, configurable method of receiving and using output data from a remote service API, but do not require the workflow designer to have to write any program logic or code to parse this output data.

VII. Example Operations

Figure 11:
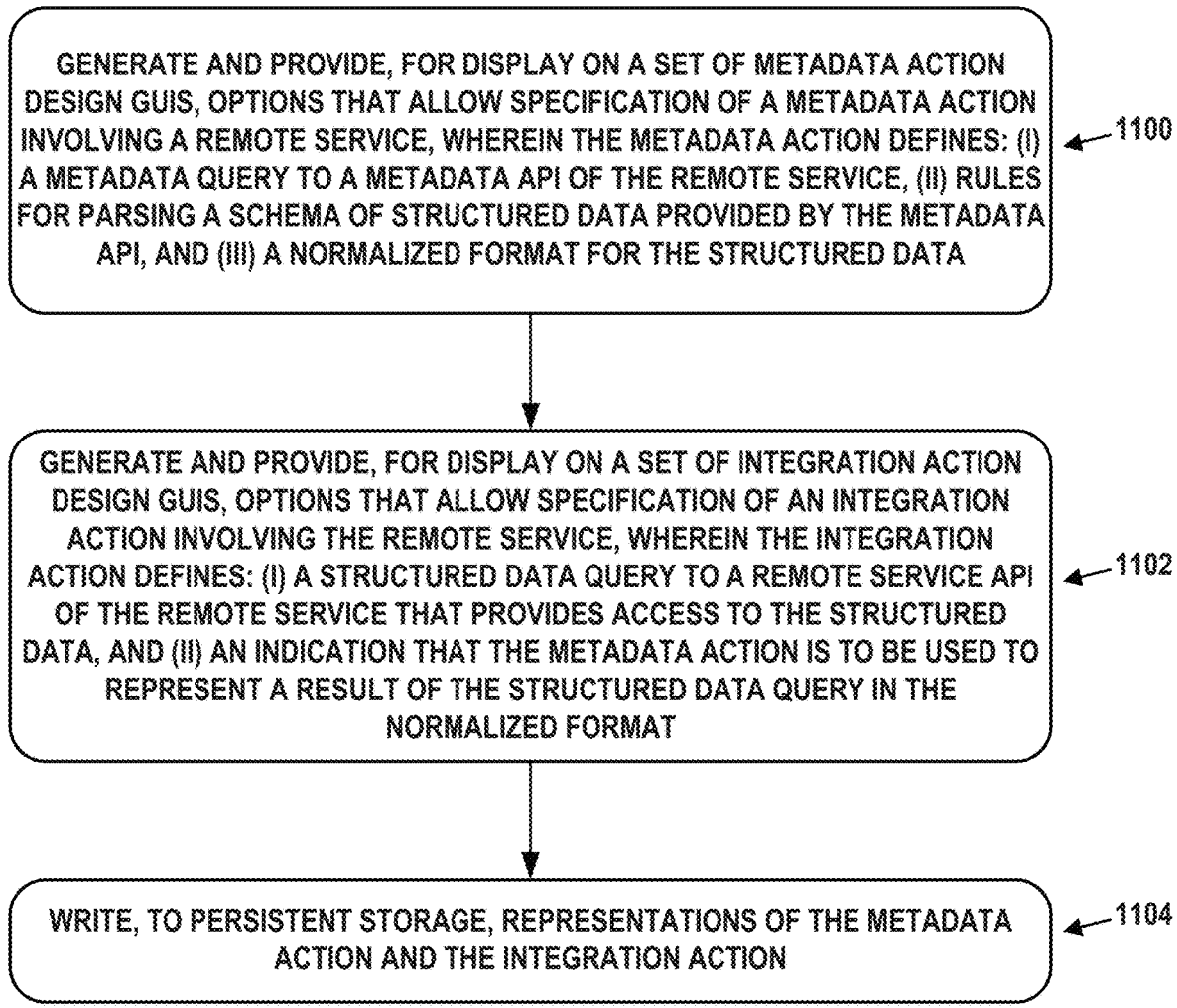
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200 or computational instance 322. However, the process can be carried out by other types of devices or device subsystems.

The embodiments of FIG. 11 may be simplified by the removal of any one or more of the features shown therein. Further, these embodiments may be combined with features, aspects, and/or implementations of any of the previous figures or otherwise described herein.

Block 1100 may involve generating and providing, for display on a set of metadata action design GUIs, options that allow specification of a metadata action involving a remote service, wherein the metadata action defines: (i) a metadata query to a metadata API of the remote service, (ii) rules for parsing a schema of structured data provided by the metadata API, and (iii) a normalized format for the structured data.

Block 1102 may involve generating and providing, for display on a set of integration action design GUIs, options that allow specification of an integration action involving the remote service, wherein the integration action defines: (i) a structured data query to a remote service API of the remote service that provides access to the structured data, and (ii) an indication that the metadata action is to be used to represent a result of the structured data query in the normalized format.

Block 1104 writing, to persistent storage, representations of the metadata action and the integration action.

Some embodiments may further involve: generating and providing, for display on a set of workflow design GUIs, options that allow specification of a workflow involving the remote service, wherein the workflow defines a trigger event that initiates the workflow, and wherein the workflow incorporates the integration action; and writing, to the persistent storage, a representation of the workflow.

In some embodiments, the set of workflow design GUIs also allow specification of a further action of the workflow that uses part of the result of the structured data query.

Some embodiments may further involve: determining that the trigger event has occurred; and in response to determining that the trigger event has occurred, executing the workflow, wherein execution of the workflow involves: (i) transmitting, to the remote service API, the structured data query, (ii) obtaining, from the remote service API, the result of the structured data query, and (iii) performing the further action on the part of the result of the structured data query.

In some embodiments, the result of the structured data query is represented on the set of workflow design GUIs as a hierarchy of selectable data items in accordance with the normalized format, and the set of workflow design GUIs allows dragging of one or more of the selectable data items into an input field of the further action.

In some embodiments, the result of the structured data query is a unit of the structured data representing columns of a table accessible by way of the remote service API, and the integration action, as represented in the set of workflow design GUIs, is configurable to select any one of a plurality of tables accessible by way of the remote service API.

Some embodiments may further involve, during the specification of the workflow: receiving, by way of the set of workflow design GUIs, a selection of a particular table of the plurality of tables; retrieving, by way of the metadata query and from metadata API, a schema of the particular table; and displaying, by way of the set of workflow design GUIs and in accordance with the normalized format, columns of the particular table as a hierarchy of selectable data items.

Some embodiments may further involve: generating and providing, for display on the set of workflow design GUIs, options that allow specification of a second workflow involving the remote service, wherein the second workflow specifies a second trigger event that initiates the second workflow, and wherein the second workflow incorporates the integration action; and writing, to the persistent storage, a representation of the second workflow, wherein the workflow and the second workflow are independently executable.

In some embodiments, the options that allow specification of the metadata action comprise definitions of inputs to the metadata action, an address of the metadata API as part of the metadata query, a script to parse results of querying the metadata API, and the normalized format, and the script to parse results of querying the metadata API includes the rules for parsing the schema of the structured data.

In some embodiments, the options that allow specification of the integration action comprise definitions of inputs to the integration action, an address of the remote service API as part of the structured data query, and an output format for at least part of the result of the structured data query.

In some embodiments, the remote service is physically distinct from the computational instance.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method, comprising:
    causing, via a processor, a workflow design graphical user interface (GUI) to be displayed on a client device, wherein the workflow design GUI comprises a menu of actions available to be incorporated into a workflow;
    receiving an input indicative of a command to incorporate an integration action into the workflow, wherein the integration action defines a structured data query to a remote service application programming interface (API) of a remote service that provides access to structured data, and wherein the integration action defines an indication that a metadata action is to be performed to query a metadata API for a schema of a result of the structured data query to present the result of the structured data query in a normalized format based on the schema of the result of the structured data query; and
    writing, via the processor, a representation of the workflow to a persistent storage, wherein the workflow comprises the integration action to be performed based on a trigger.

2. The method of claim 1, further comprising causing the result of the structured data query to be displayed on the workflow design GUI in the normalized format upon receiving the input indicative of the command to incorporate the integration action into the workflow.

3. The method of claim 1, further comprising causing a menu to be displayed on the workflow design GUI, wherein the menu comprises a plurality of integration actions selectable for incorporation into the workflow, and wherein the input indicative of the command to incorporate the integration action into the workflow is received via the menu.

4. The method of claim 1, wherein the integration action defines a list of tables to be retrieved, and wherein the method further comprises querying the metadata API for the list of tables in response to receiving the input indicative of the command to incorporate the integration action into the workflow.

5. The method of claim 4, further comprising causing a first menu to be displayed on the workflow design GUI, wherein the first menu comprises the list of tables, and wherein each table of the list of tables is selectable for incorporation into the workflow.

6. The method of claim 5, further comprising receiving an additional input to retrieve a table from the list of tables and presenting a second menu comprising a plurality of additional actions to be performed with respect to the table from the list of tables.

7. The method of claim 6, further comprising querying the metadata API for a particular schema of the table from the list of tables in response to receiving the additional input and presenting data items selectable for incorporation into the workflow for each additional action of the plurality of additional actions based on the particular schema of the table from the list of tables.

8. The method of claim 6, further comprising receiving a further input indicative of a selection of an additional action of the plurality of additional actions such that the workflow comprises the additional action of the plurality of additional actions to be performed on the table from the list of tables based on the trigger.

9. A system, comprising:
    a processor; and
    a persistent storage accessible by the processor, the persistent storage storing instructions that, when executed by the processor, cause the processor to perform operations comprising:
        causing a first menu to be displayed via a workflow design graphical user interface (GUI) of a client device, wherein the first menu comprises a plurality of integration actions;
        receiving a first input indicative of a selection of an integration action of the plurality of integration actions to be incorporated into a workflow, wherein the integration action of the plurality of integration actions defines a structured data query to a remote service application programming interface (API) of a remote service that provides access to structured data, and wherein the integration action of the plurality of integration actions comprises a metadata action to be performed to query a metadata API of the remote service to retrieve a list of tables and respective schemas of the list of tables for presenting a result of the structured data query in a normalized format based on the respective schemas of the list of tables; and storing the workflow in the persistent storage, wherein the workflow comprises the integration action of the plurality of integration actions to be performed in response to a trigger to retrieve the list of tables.

10. The system of claim 9, wherein the operations further comprise:
causing a second menu to be displayed via the workflow design GUI of the client device, wherein the second menu comprises the list of tables retrieved via the metadata action; and
receiving a second input indicative of a selection of a table from the list of tables via the second menu.

11. The system of claim 10, wherein the operations further comprise:
causing a third menu to be displayed via the workflow design GUI of the client device, wherein the third menu comprises a plurality of additional actions selectable for performance with respect to the table from the list of tables; and
receiving a third input indicative of a selection of an additional action of the plurality of additional actions via the third menu.

12. The system of claim 11, wherein the operations further comprise executing the workflow to perform the additional action of the plurality of additional actions with respect to the table from the list of tables in response to the trigger to retrieve the list of tables.

13. The system of claim 11, wherein the metadata action causes query of the metadata API to retrieve a particular schema of data items associated with the table from the list of tables, and wherein the additional action of the plurality of additional actions comprises a data item selected from the particular schema of data items associated with the table from the list of tables.

14. The system of claim 9, wherein the operations further comprise causing a pane to be displayed on the workflow design GUI based on the metadata action, and wherein the pane comprises the result of the structured data query in the normalized format upon receiving the first input indicative of the selection of the integration action of the plurality of integration actions to be incorporated into the workflow.

15. A non-transitory computer-readable medium storing instructions that, when executed by one or more processors, are configured to cause the one or more processors to perform operations comprising:
causing a first pane to be displayed on a workflow design graphical user interface (GUI) of a client device, wherein the first pane comprises a menu comprising a plurality of integration actions available for selection to incorporate in a workflow, wherein a first integration action of the plurality of integration actions defines a structured data query to a remote service application programming interface (API) that provides access to structured data, wherein the first integration action of the plurality of integration actions comprises an indication that a metadata action is to be performed, and wherein the metadata action defines a metadata query to a metadata API that provides access to a schema of the structured data to present a result of the structured data query in a normalized format defined by the metadata action and based on the schema of the structured data;
causing a second pane to be displayed on the workflow design GUI, wherein the second pane comprises the result of the structured data query presented in the normalized format in response to a selection of the first integration action of the plurality of integration actions for incorporation in the workflow; and
storing the workflow in a persistent storage to perform the first integration action of the plurality of integration actions in response to a trigger.

16. The non-transitory computer-readable medium storing instructions of claim 15, wherein the operations further comprise:
receiving specification of a second integration action of the plurality of integration actions that uses a part of the result of the structured data query presented in the normalized format by the second pane; and
storing the workflow to perform the first integration action of the plurality of integration actions and the second integration action of the plurality of integration actions in response to the trigger.

17. The non-transitory computer-readable medium storing instructions of claim 16, wherein the operations further comprise:
determining that the trigger has occurred;
transmitting the structured data query to the remote service API in response to the determination that the trigger has occurred;
obtaining the result of the structured data query presented in the normalized format in response to transmission of the structured data query to the remote service API; and
performing the second integration action of the plurality of integration actions that uses the part of the result of the structured data query in response to obtainment of the result of the structured data query.

18. The non-transitory computer-readable medium storing instructions of claim 15, wherein the operations further comprise:
retrieving a list of tables via the metadata query to the metadata API;
receiving a selection of a table from the list of tables;
retrieving a particular schema associated with the table from the list of tables; and
causing data from the table from the list of tables to be displayed on the second pane as a hierarchy of selectable data items based on the particular schema associated with the table from the list of tables.

19. The non-transitory computer-readable medium storing instructions of claim 18, wherein the operations further comprise incorporating a selectable data item of the hierarchy of selectable data items from the first pane into the second pane to define a second integration action of the plurality of integration actions to be performed in response to the trigger.

20. The non-transitory computer-readable medium storing instructions of claim 18, wherein the operations further comprise:
receiving an additional selection of an additional table from the list of tables;
retrieving an additional particular schema associated with the additional table from the list of tables; and
updating the second pane to cause data of the additional table from the list of tables to be displayed as an additional hierarchy of selectable data items based on the additional particular schema associated with the additional table from the list of tables.

\* \* \* \* \*